United States Patent
Ma et al.

(10) Patent No.: US 12,434,245 B2
(45) Date of Patent: Oct. 7, 2025

(54) WELL PLATE FOR IMAGING

(71) Applicant: The University of British Columbia, Vancouver (CA)

(72) Inventors: Hongshen Ma, Vancouver (CA); Samuel Guy Berryman, Vancouver (CA)

(73) Assignee: THE UNIVERSITY OF BRITISH COLUMBIA, Vancouver (CA)

( * ) Notice: Subject to any disclaimer, the term of this patent is extended or adjusted under 35 U.S.C. 154(b) by 0 days.

(21) Appl. No.: 18/767,337

(22) Filed: Jul. 9, 2024

(65) Prior Publication Data

US 2024/0359184 A1    Oct. 31, 2024

Related U.S. Application Data

(63) Continuation of application No. PCT/CA2024/050183, filed on Feb. 13, 2024.

(60) Provisional application No. 63/445,133, filed on Feb. 13, 2023.

(51) Int. Cl.
    *B01L 3/00* (2006.01)

(52) U.S. Cl.
    CPC ..... *B01L 3/5085* (2013.01); *B01L 2300/0829* (2013.01); *B01L 2300/0858* (2013.01); *B01L 2300/12* (2013.01); *B01L 2300/168* (2013.01)

(58) Field of Classification Search
    CPC ........... B01L 3/5085; B01L 2300/0829; B01L 2300/12
    See application file for complete search history.

(56) References Cited

U.S. PATENT DOCUMENTS

| | | | |
|---|---|---|---|
| 5,310,674 A * | 5/1994 | Weinreb | C12M 23/12 435/308.1 |
| 9,200,245 B2 | 12/2015 | Deutsch et al. | |
| 9,902,860 B1 | 2/2018 | Li et al. | |
| 10,190,082 B2 | 1/2019 | Deutsch et al. | |
| 2005/0170498 A1 | 8/2005 | Dolley et al. | |
| 2007/0178534 A1 * | 8/2007 | Murphy | G01N 33/5005 435/7.2 |
| 2008/0063572 A1 | 3/2008 | Deutsch et al. | |
| 2014/0227784 A1 | 8/2014 | Ejiri et al. | |
| 2014/0323330 A1 * | 10/2014 | Bergo | G01N 33/6851 506/18 |
| 2017/0363545 A1 | 12/2017 | Halverson et al. | |
| 2018/0264465 A1 | 9/2018 | Höhnel et al. | |

FOREIGN PATENT DOCUMENTS

| | | |
|---|---|---|
| WO | 2014172716 A4 | 12/2014 |
| WO | 2017059227 A1 | 4/2017 |

OTHER PUBLICATIONS

Choi et al., "Monolithic hydrogel nanowells-in-microwells enabling simultaneous single cell secretion and phenotype analysis", Dec. 2020.
Yu et al., "Multi-responsive and conductive bilayer hydrogel and its application in flexible devices", Dec. 31, 2022.
Ibidi, "Micro-Insert 4 Well", May 9, 2016.
Price et al., "Assessing cell competition in human pluripotent stem cell (hPSC) cultures", Mar. 27, 2022.
Revzin et al., "Designing a hepatocellular microenvironment with protein microarraying and poly(ethylene glycol) Photolithography", Apr. 2004.
An et al., "Single-cell profiling of dynamic cytokine secretion and the phenotype of immune cells", 2017.
Shadpour et al., "Enrichment and Expansion of Cells using Antibody-Costed Micropallet Arrays", 2009.

* cited by examiner

*Primary Examiner* — Natalia Levkovich
(74) *Attorney, Agent, or Firm* — Roni M. Jones; Oyen Wiggs Green & Mutala LLP

(57) ABSTRACT

One aspect of the invention provides a well plate. The well plate may comprise a substrate, a primary structure attached to a first side of the substrate and a light absorbent secondary structure attached to the first side of the substrate. The primary structure may comprise a plurality of walls wherein the plurality of walls and the substrate together define a plurality of wells. The secondary structure may comprise, within each of the plurality of the wells, a plurality of sub-walls wherein each plurality of sub-walls and the substrate together define a plurality of sub-wells.

21 Claims, 9 Drawing Sheets

WELL PLATE FOR IMAGING

REFERENCE TO RELATED APPLICATIONS

This application is a continuation of Patent Cooperation Treaty (PCT) application No. PCT/CA2024/050183 having an international filing date of 13 Feb. 2024 which in turn claims priority from, and for the purposes of the United States the benefit under 35 USC 119 in relation to, U.S. patent application No. 63/445,133 filed on 13 Feb. 2023, which is hereby incorporated herein by reference.

TECHNICAL FIELD

The present invention relates to the field of cellular biology and more particularly to well plates for studying cells.

BACKGROUND

In biological assays, it is frequently useful to isolate individual cells or a small number of cells in order to observe their behaviour without being confounded by the presence of other cells. Well plates may be employed for this task. Well plates may comprise a plurality of wells for each receiving individual cells or a small number of cells. Well plates may include multiwell plates, nanowell plates, microwell plates, microplates, microtiter plates, etc. Commonly used well plates suffer from a number of shortcomings.

For example, the materials used to fabricate commonly used well plates are known to emit optical signals, such as from luminescence, auto-fluorescence, birefringence or light scattering. These optical signals may provide an undesirable confounding signal during a cellular assay. As such, there remains a desire for well plates fabricated at least in part from materials that are optically absorbent.

As another example, some commonly used well plates are fabricated as a monolith such that a bottom surface of each well is the same material as the sidewalls of each well. Such a monolithic structure may encourage cells to grow on or attach to the sidewalls of the wells thereby hindering images as not all cells would be in the same focal plane. As such, there remains a desire for well plates that promote growth of cells on or attachment of cells to the bottom surface of the wells.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

On aspect of the invention provides a well plate. The well plate may comprise a substrate, a primary structure attached to a first side of the substrate, and a light absorbent secondary structure attached to the first side of the substrate. The primary structure may comprise a plurality of walls wherein the plurality of walls and the substrate together define a plurality of wells. The secondary structure may comprise, within each of the plurality of the wells, a plurality of sub-walls wherein each plurality of sub-walls and the substrate together define a plurality of sub-wells.

Another aspect of the invention provides a well plate comprises a substrate, a primary structure, and a light absorbent secondary structure attached to a first side of the substrate. The secondary structure comprises a plurality of sub-walls wherein the plurality of sub-walls and the substrate together define a plurality of sub-wells. The primary structure is attached to the secondary structure and the plurality of walls define a plurality of wells.

In some embodiments, the plurality of walls define sidewalls of each of the wells and the substrate defines a bottom of each of the wells. In some embodiments, the plurality of sub-walls define sidewalls of each of the sub-wells and the substrate defines a bottom of each of the sub-wells.

In some embodiments, a height of each of the plurality of sub-wells is less than a height of each of the plurality of wells. In some embodiments, a transverse dimension of each of the wells is between approximately 5 μm and 1,000 μm. In some embodiments, a transverse dimension of each of the sub-wells is between approximately 5 μm and 1,000 μm. In some embodiments, a height of each of the wells is between 1 μm and 1000 μm and a height of each of the sub-wells is between 1 μm and 1,000 μm.

In some embodiments, for each sub-wall, a thickness is greater at a location closer to the substrate than at a location further from the substrate. In some embodiments, a thickness of each sub-wall tapers as the sub-wall extends further from the substrate.

In some embodiments, the substrate comprises glass. In some embodiments, the substrate comprises borosilicate glass. In some embodiments, the substrate comprises a coverslip.

In some embodiments, the primary structure comprises an ANSI-dimensioned microwell plate. In some embodiments, the primary structure comprises a polymer. In some embodiments, the primary structure comprises polypropylene.

In some embodiments, the secondary structure comprises a polymerized solid. In some embodiments, the polymerized solid is fabricated from a mixture of precursor components, the precursor components comprises a structural precursor, a viscosity modifying precursor, a photo-initiator precursor and a pigment precursor.

In some embodiments, the secondary structure comprises a hydrogel. In some embodiments, the hydrogel is fabricated from a mixture of precursor components, the precursor components comprises a structural precursor, a viscosity modifying precursor, a photo-initiator precursor and a pigment precursor.

In some embodiments, the structural precursor comprises an acrylate-terminated polymer. In some embodiments, the structural precursor comprises an acrylate-terminated polymer with a molecular weight of between approximately 100 g/mol and 50,000 g/mol. In some embodiments, the structural precursor comprises an acrylate-terminated polymer with a molecular weight of between approximately 100 g/mol and 1000 g/mol. In some embodiments, the structural precursor comprises diurethane dimethacrylate. In some embodiments, the structural precursor comprises one or more of diurethane dimethacrylate, bisphenol A-glycidyl methacrylate (BisGMA), trethane diacrylate (UDA), urethane dimethacrylate (UDMA), poly(methyl methacrylate) (PMMA), poly(methyl acylate) (PMA) and polyethylene glycol diacrylate (PEGDA).

In some embodiments, the viscosity modifying precursor comprises a methacrylate-terminated polymer. In some embodiments, the viscosity modifying precursor comprises a methacrylate-terminated polymer with a molecular weight of between approximately 50 g/mol and 1,000 g/mol. In some embodiments, the viscosity modifying precursor comprises a methacrylate-terminated polymer with a molecular weight of between approximately 50 g/mol and 100 g/mol. In some embodiments, the viscosity modifying precursor comprises a polyfunctional (meth)acrylate monomer. In some embodiments, the viscosity modifying precursor comprises 2-hydroxyethyl methacrylate. In some embodiments, the viscosity modifying precursor comprises one or more of 2-hydroxyethyl methacrylate, ethylene glycol dimethacrylate, diethylene glycol dimethacrylate, triethylene glycol dimethacrylate, polyethylene glycol dimethacrylate, 2.2 bis4 (methacryloxyethoxy)phenylpropane, tricylodecane dimethanol dimethacrylate, 1,10-decandiol dimethacrylate, 1.6-hexanediol dimethacyrlate, 1.9-nonanediol dimethacrylate, neopentylglycol dimethacrylate, 2-hydroxy 1-3 dimethacryloxyproane, trimethyolpropane trimethacrylate, ethoxylated trimethyol propane trimethacrylate, ditrimethyolpropane tetramethacrylate, tris(2-hydroxy ethyl) isocyanurate trimethacrylate, dipentaerythritol pentamethacrylate, ethyoxylated pentaerythritol tetramethacrylate, propoxylatedglyceryl trimethacrylate, propoxylated trimethylolpropane trimethacrylate and polyester dendrimer.

In some embodiments, the photo-initiator precursor comprises diphenyl(2,4,6-trimethylbenzoyl) phosphine oxide. In some embodiments, the photo-initiator precursor comprises one or more of diphenyl(2,4,6-trimethylbenzoyl) phosphine oxide, Ciba™ IRGACURE™ 819, 2,4,6-trimethylbenzoyl diphenyl phosphine, 2-hydroxy-2-methyl-1-phenyl-1-propan and benzophenone.

In some embodiments, the pigment precursor comprises a light-absorbing compound. In some embodiments, the pigment precursor comprises a black pigment. In some embodiments, the pigment precursor absorbs more between approximately 90% and 100% of incident light or preferably more than 99% of incident light. In some embodiments, the pigment precursor comprises one or more of carbon black, ivory black pigment, bone black pigment, mars black pigment, lamp black pigment, Sigma-Aldrich™ Sudan Black B staining system, Sigma-Aldrich™ Brilliant Black BN.

In some embodiments, the mixture of precursor components comprises: between approximately 40% (by weight) to 99.5% (by weight) of the structural precursor, between approximately 5% (by weight) to 60% (by weight) of the viscosity modifying precursor, between approximately 0.5% (by weight) to 5.0% (by weight) of the photo-initiator precursor, and between approximately 0.01% (by weight) to 3.0% (by weight) of the pigment precursor.

In some embodiments, the mixture of precursor components comprises a surface modifying precursor. In some embodiments, the surface modifying precursor comprises one or more of polyethylene glycol diacrylate (PEGDA) having a polymer chain length of between approximately 250 and 20,000 and 1H, 1H,2H,2H-perfluorooctyltriethoxysilane. In some embodiments, the mixture of precursor components comprise between approximately 0% (by weight) to 20% (by weight) of the surface modifying precursor. In some embodiments, the surface modifying precursor comprises polyethylene glycol diacrylate (PEGDA) having a polymer chain length of between approximately 250 and 20,000 and the mixture of precursor components comprise between approximately 0% (by weight) to 20% (by weight) of the surface modifying precursor. In some embodiments, the surface modifying precursor comprises 1H, 1H,2H,2H-perfluorooctyltriethoxysilane and the mixture of precursor components comprise between approximately 0% (by weight) to 10% (by weight) of the surface modifying precursor.

In some embodiments, the mixture of precursor components comprises: 78.5% (by weight) of the structural precursor comprises diurethane dimethacrylate, 19.5% (by weight) of the viscosity modifying precursor comprises 2-hydroxyethyl methacrylate, 1.0% (by weight) of the photo-initiator precursor comprises diphenyl(2,4,6-trimethylbenzoyl) phosphine oxide, and 1.0% (by weight) of the pigment precursor comprises carbon black.

In some embodiments, mixture of precursor components comprises: 77.0% (by weight) of the structural precursor comprises diurethane dimethacrylate, 18.0% (by weight) of the viscosity modifying precursor comprises 2-hydroxyethyl methacrylate, 4.0% (by weight) of the photo-initiator precursor comprises diphenyl(2,4,6-trimethylbenzoyl) phosphine oxide, and 1.0% (by weight) of the pigment precursor comprises carbon black.

In some embodiments, the mixture of precursor components comprises: 65.0% (by weight) of the structural precursor comprises diurethane dimethacrylate, 32.5% (by weight) of the viscosity modifying precursor comprises 2-hydroxyethyl methacrylate, 2.0% (by weight) of the photo-initiator precursor comprises diphenyl(2,4,6-trimethylbenzoyl) phosphine oxide, and 0.5% (by weight) of the pigment precursor comprises carbon black.

In some embodiments, the mixture of precursor components comprises: 40.0% (by weight) of the structural precursor comprises diurethane dimethacrylate, 53.0% (by weight) of the viscosity modifying precursor comprises 2-hydroxyethyl methacrylate, 5.0% (by weight) of the photo-initiator precursor comprises diphenyl(2,4,6-trimethylbenzoyl) phosphine oxide, and 2.0% (by weight) of the pigment precursor comprises carbon black.

In some embodiments, the secondary structure is black. In some embodiments, the secondary structure absorbs between approximately 90% and 100% of incident light. In some embodiments, the secondary structure absorbs more than approximately 99% of incident light.

Another aspect of the invention provides a method of fabricating a well plate. The method may comprises providing a substrate, attaching a primary structure to a first side of the substrate and attaching a light absorbent secondary structure to the first side of the substrate. The primary structure comprises a plurality of walls such that the plurality of walls and the substrate together define a plurality of wells. The secondary structure comprises, within each of the plurality of the wells, a plurality of sub-walls such that each plurality of sub-walls and the substrate together define a plurality of sub-wells.

Another aspect of the invention provides a method of fabricating a well plate. The method comprises providing a substrate, providing a primary structure, attaching a light absorbent secondary structure to a first side of the substrate and attaching the primary structure to the secondary structure. The primary structure comprises a plurality of walls and the plurality of walls define a plurality of wells. The secondary structure comprises a plurality of sub-walls and the plurality of sub-walls and the substrate together define a plurality of sub-wells In some embodiments, the method comprises silanization of the first side of the substrate before the steps of attaching the primary structure to the first side of the substrate and attaching the secondary structure to the first side of the substrate. In some embodiments, silanization of the substrate comprises soaking the substrate in a silanization solution. In some embodiments, silanization of the substrate comprises coating the substrate in a silanization solution in a gas state. In some embodiments, the silanization solution comprises 3-(Trimethoxysilyl) propyl methacrylate (TMSPMA).

In some embodiments, attaching a secondary structure to the first side of the substrate comprises: mixing a plurality of precursor components to form a mixture of precursor components, coating the first side of the substrate with the mixture of precursor components to form a layer and curing or polymerizing at least a portion of the layer to form the secondary structure on the first side of the substrate. In some embodiments, coating the first side of the substrate with the mixture of precursor components comprises dipping the first side of the substrate into the mixture of precursor components. In some embodiments, coating the first side of the substrate with the mixture of precursor components comprises applying the mixture of precursor components to the first side of the substrate with a brush. In some embodiments, curing or polymerizing at least the portion of the layer comprises exposing at least the portion of the layer to ultraviolet light. In some embodiments, curing or polymerizing at least the portion of the layer comprises projecting ultraviolet light onto the at least the portion of the layer through a photomask having a pattern shaped according to a desired shape of the secondary structure.

In some embodiments, the method comprises controlling a height of the secondary structure by controlling the amount of time during which the at least a portion of the layer is exposed to the ultraviolet light.

In some embodiments, the method comprises removing excess material after the step of curing or polymerizing at least the portion of the layer.

In some embodiments, the method comprises coating the secondary structure in a non-adherent solution after attaching the secondary structure to the first side of the substrate.

In some embodiments, the method comprises attaching the primary structure to the first side of the substrate after attaching the secondary structure to the first side of the substrate.

In some embodiments, the method comprises using a jig to align the primary structure with the secondary structure when attaching the primary structure to the first side of the substrate after attaching the secondary structure to the first side of the substrate.

In some embodiments, attaching the primary structure to the first side of the substrate comprises attaching the primary structure to the first side of the substrate with ultraviolet light curable adhesive. In some embodiments, attaching the primary structure to the first side of the substrate comprises attaching the primary structure to the first side of the substrate with heat curable adhesive.

In some embodiments, the method comprises controlling a height of the secondary structure by choosing the composition of the mixture of precursor components. In some embodiments, the a mixture of precursor components comprises a structural precursor, a viscosity modifying precursor, a photo-initiator precursor and a pigment precursor.

In some embodiments, the structural precursor comprises an acrylate-terminated polymer. In some embodiments, the structural precursor comprises an acrylate-terminated polymer with a molecular weight of between approximately 100 g/mol and 50,000 g/mol. In some embodiments, the structural precursor comprises an acrylate-terminated polymer with a molecular weight of between approximately 100 g/mol and 1000 g/mol. In some embodiments, the structural precursor comprises diurethane dimethacrylate. In some embodiments, the structural precursor comprises one or more of diurethane dimethacrylate, bisphenol A-glycidyl methacrylate (BisGMA), trethane diacrylate (UDA), urethane dimethacrylate (UDMA), poly(methyl methacrylate) (PMMA), poly(methyl acylate) (PMA) and polyethylene glycol diacrylate (PEGDA).

In some embodiments, the viscosity modifying precursor comprises a methacrylate-terminated polymer. In some embodiments, the viscosity modifying precursor comprises a methacrylate-terminated polymer with a molecular weight of between approximately 50 g/mol and 1,000 g/mol. In some embodiments, the viscosity modifying precursor comprises a methacrylate-terminated polymer with a molecular weight of between approximately 50 g/mol and 100 g/mol. In some embodiments, the viscosity modifying precursor comprises a polyfunctional (meth)acrylate monomer. In some embodiments, the viscosity modifying precursor comprises 2-hydroxyethyl methacrylate. In some embodiments, the viscosity modifying precursor comprises one or more of 2-hydroxyethyl methacrylate, ethylene glycol dimethacrylate, diethylene glycol dimethacrylate, triethylene glycol dimethacrylate, polyethylene glycol dimethacrylate, 2.2 bis4 (methacryloxyethoxy)phenylpropane, tricylodecane dimethanol dimethacrylate, 1,10-decandiol dimethacrylate, 1.6-hexanediol dimethacyrlate, 1.9-nonanediol dimethacrylate, neopentylglycol dimethacrylate, 2-hydroxy 1-3 dimethacryloxyproane, trimethyolpropane trimethacrylate, ethoxylated trimethyol propane trimethacrylate, ditrimethyolpropane tetramethacrylate, tris(2-hydroxy ethyl) isocyanurate trimethacrylate, dipentaerythritol pentamethacrylate, ethyoxylated pentaerythritol tetramethacrylate, propoxylatedglyceryl trimethacrylate, propoxylated trimethylolpropane trimethacrylate and polyester dendrimer.

In some embodiments, the photo-initiator precursor comprises diphenyl(2,4,6-trimethylbenzoyl) phosphine oxide. In some embodiments, the photo-initiator precursor comprises one or more of diphenyl(2,4,6-trimethylbenzoyl) phosphine oxide, Ciba™ IRGACURE™ 819, 2,4,6-trimethylbenzoyl diphenyl phosphine, 2-hydroxy-2-methyl-1-phenyl-1-propan and benzophenone.

In some embodiments, the pigment precursor comprises a light-absorbing compound. In some embodiments, the pigment precursor comprises a black pigment. In some embodiments, the pigment precursor absorbs more between approximately 90% and 100% of incident light or preferably more than 99% of incident light. In some embodiments, the pigment precursor comprises one or more of carbon black, ivory black pigment, bone black pigment, mars black pigment, lamp black pigment, Sigma-Aldrich™ Sudan Black B staining system, Sigma-Aldrich™ Brilliant Black BN.

In some embodiments, the mixture of precursor components comprises: between approximately 40% (by weight) to 99.5% (by weight) of the structural precursor, between approximately 5% (by weight) to 60% (by weight) of the viscosity modifying precursor, between approximately 0.5% (by weight) to 5.0% (by weight) of the photo-initiator precursor, and between approximately 0.01% (by weight) to 3.0% (by weight) of the pigment precursor.

In some embodiments, the mixture of precursor components comprises a surface modifying precursor. In some embodiments, the surface modifying precursor comprises one or more of polyethylene glycol diacrylate (PEGDA) having a polymer chain length of between approximately 250 and 20,000 and 1H, 1H,2H,2H-perfluorooctyltriethoxysilane. In some embodiments, the mixture of precursor components comprise between approximately 0% (by weight) to 20% (by weight) of the surface modifying precursor. In some embodiments, the surface modifying precursor comprises polyethylene glycol diacrylate (PEGDA) having a polymer chain length of between approximately 250 and 20,000 and the mixture of precursor components comprise between approximately 0% (by weight) to 20% (by weight) of the surface modifying precursor. In some embodiments, the surface modifying precursor comprises 1H, 1H,2H,2H-perfluorooctyltriethoxysilane and the mixture of precursor components comprise between approximately 0% (by weight) to 10% (by weight) of the surface modifying precursor.

In some embodiments, the mixture of precursor components comprises: 78.5% (by weight) of the structural precursor comprises diurethane dimethacrylate, 19.5% (by weight) of the viscosity modifying precursor comprises 2-hydroxyethyl methacrylate, 1.0% (by weight) of the photo-initiator precursor comprises diphenyl(2,4,6-trimethylbenzoyl) phosphine oxide, and 1.0% (by weight) of the pigment precursor comprises carbon black.

In some embodiments, mixture of precursor components comprises: 77.0% (by weight) of the structural precursor comprises diurethane dimethacrylate, 18.0% (by weight) of the viscosity modifying precursor comprises 2-hydroxyethyl methacrylate, 4.0% (by weight) of the photo-initiator precursor comprises diphenyl(2,4,6-trimethylbenzoyl) phosphine oxide, and 1.0% (by weight) of the pigment precursor comprises carbon black.

In some embodiments, the mixture of precursor components comprises: 65.0% (by weight) of the structural precursor comprises diurethane dimethacrylate, 32.5% (by weight) of the viscosity modifying precursor comprises 2-hydroxyethyl methacrylate, 2.0% (by weight) of the photo-initiator precursor comprises diphenyl(2,4,6-trimethylbenzoyl) phosphine oxide, and 0.5% (by weight) of the pigment precursor comprises carbon black.

In some embodiments, the mixture of precursor components comprises: 40.0% (by weight) of the structural precursor comprises diurethane dimethacrylate, 53.0% (by weight) of the viscosity modifying precursor comprises 2-hydroxyethyl methacrylate, 5.0% (by weight) of the photo-initiator precursor comprises diphenyl(2,4,6-trimethylbenzoyl) phosphine oxide, and 2.0% (by weight) of the pigment precursor comprises carbon black.

In some embodiments, the secondary structure is black. In some embodiments, the secondary structure absorbs between approximately 90% and 100% of incident light. In some embodiments, the secondary structure absorbs more than approximately 99% of incident light.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

One aspect of the invention provides a well plate. The well plate may comprise a substrate, a primary structure attached to a first side of the substrate and a light absorbent secondary structure attached to the first side of the substrate. The primary structure may comprise a plurality of walls wherein the plurality of walls and the substrate together define a plurality of wells. The secondary structure may comprise, within each of the plurality of the wells, a plurality of sub-walls wherein each plurality of sub-walls and the substrate together define a plurality of sub-wells.

FIGS. 1A, 1B, 1C and 1D are schematic depictions of a well plate 10 for imaging (referred to herein as plate 10) according to an example embodiment of the invention. It should be understood that FIGS. 1A, 1B, 1C and 1D are not to scale. Further, it should be understood that while plate 10 is depicted as being rectangular in shape (e.g. in the XY-plane), this is not mandatory and plate 10 may have other cross-sectional shapes such as, for example, round shapes, circular shapes, other polygonal shapes, etc.

Figure 1A:
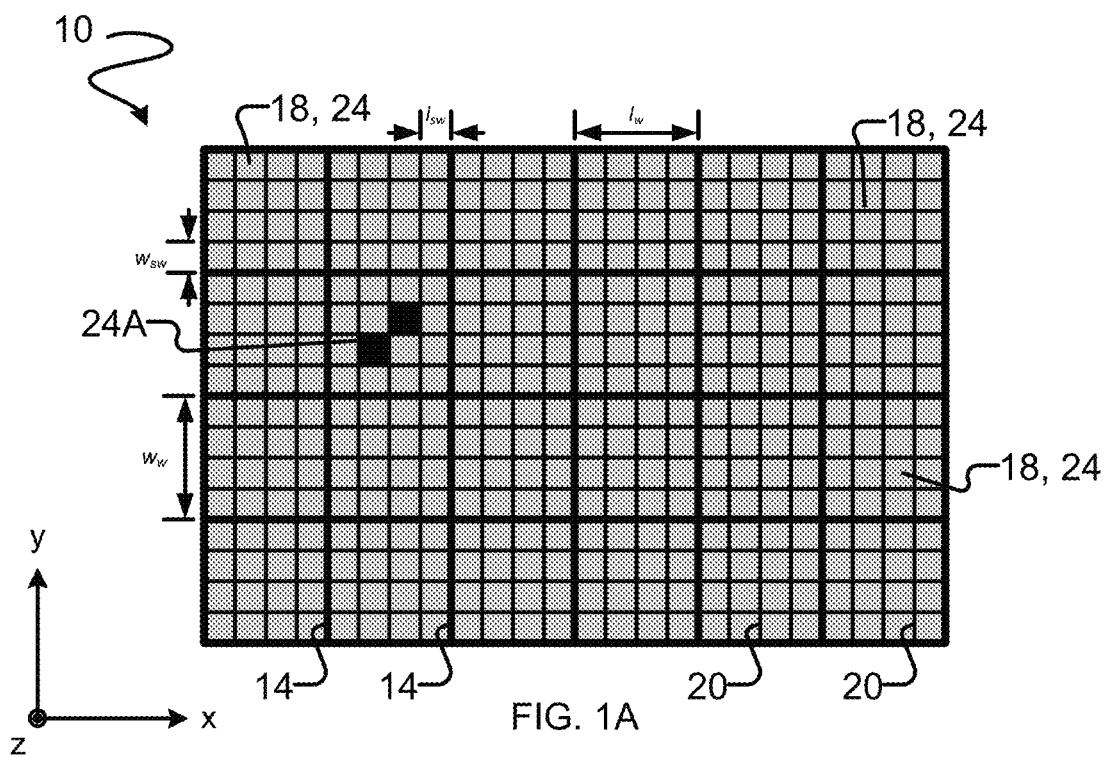
FIG. 1A is a top plan schematic depiction of an exemplary well plate according to an embodiment of the invention.
Figure 1B:
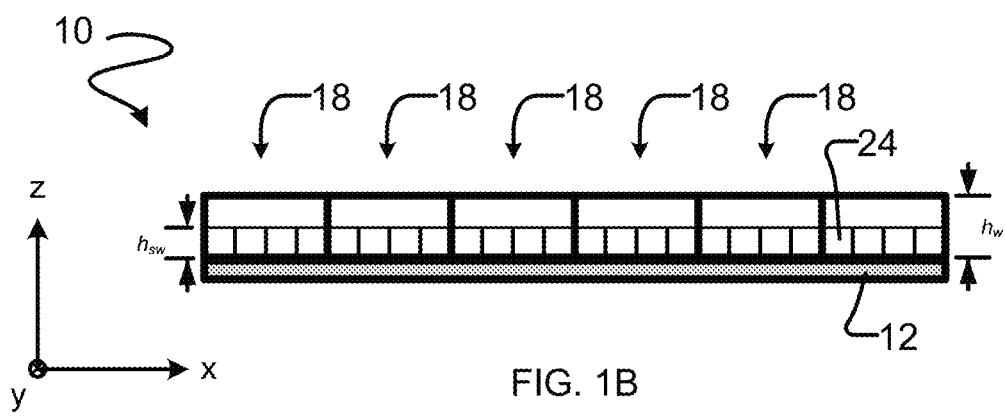
FIG. 1B is a side cross-section schematic depiction of the well plate of FIG. 1A.
Figure 1C:
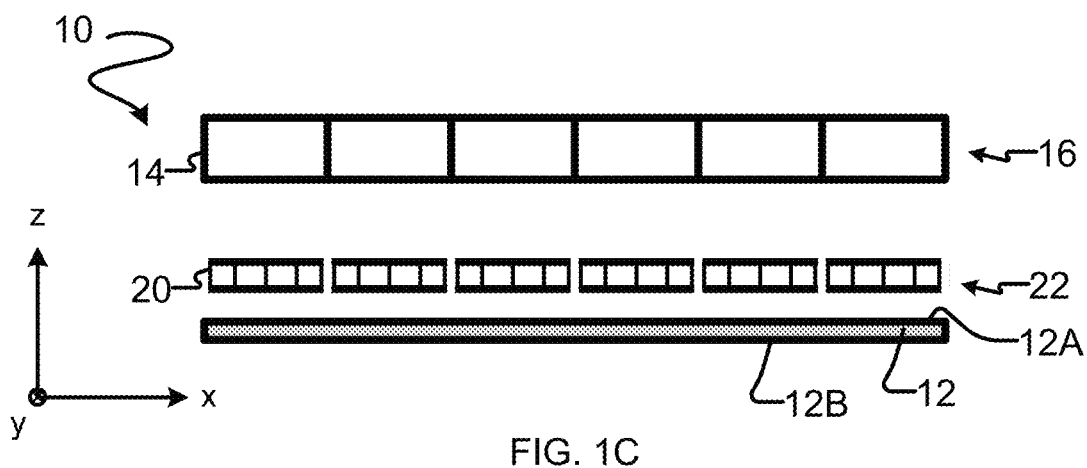
FIG. 1C is a side exploded schematic depiction of the well plate of FIG. 1A.

As best seen from FIG. 1C, plate 10 comprises a substrate 12, a primary structure 16 comprising a plurality of walls 14 and a secondary structure 22 comprising plurality of sub-walls 20. Together with substrate 12, walls 14 define wells 18 and sub-walls 20 define sub-wells 24. Specifically, substrate 12 defines a bottom surface of wells 18 and sub-wells 20 while walls 14 define the sidewalls of wells 18 and sub-walls 20 define the sidewalls of wells 24.

Substrate 12 may be non-circular (e.g., rectangular) in shape in the XY-plane. Substrate 12 may comprise any suitable substrate material. For example, substrate 12 may comprise glass such as, for example, borosilicate glass. Substrate 12 may have a Z-direction thickness of between approximately 0.1 mm and 1 mm. In some embodiments, substrate 12 has a Z-direction thickness of approximately 0.17 mm. In some embodiments, substrate 12 may comprise a coverslip as is typically used in microscopy. Where substrate 12 comprises a coverslip, this may facilitate use of plate 10 with conventional tools designed to work with coverslips.

Primary structure 16 may comprise any suitable material. For example, primary structure 16 may comprise a polymeric material such as polycarbonate, polystyrene, polypropylene or cyclo-olefin. In some embodiments, primary structure 16 comprises a prefabricated well plate structure. In some embodiments, primary structure 16 comprises a prefabricated well plate structure such as, an ANSI-dimensioned microwell plate or microwell plate frame.

Primary structure 16 may define wells 18 having X-direction lengths, $l_w$, of between approximately 0.8 mm and 120 mm, Y-direction widths, $w_w$, of between approximately 0.8 mm and 120 mm, and Z-direction heights, $h_w$, of between approximately 1 mm and 20 mm.

It should be understood that while plate 10 is depicted as comprising 24 wells 18, this is not mandatory and plate 10 could comprise any suitable number of wells 18 such as, for example, 6, 12, 48, 96, 384 or 1536 wells 18. Further, while wells 18 are depicted as being square in shape (in the XY-plane), this is not mandatory and it should be understood that wells 18 may be of any suitable shape such as a rounded shape, a circular shape, another polygonal shape, etc.

Figure 7A:
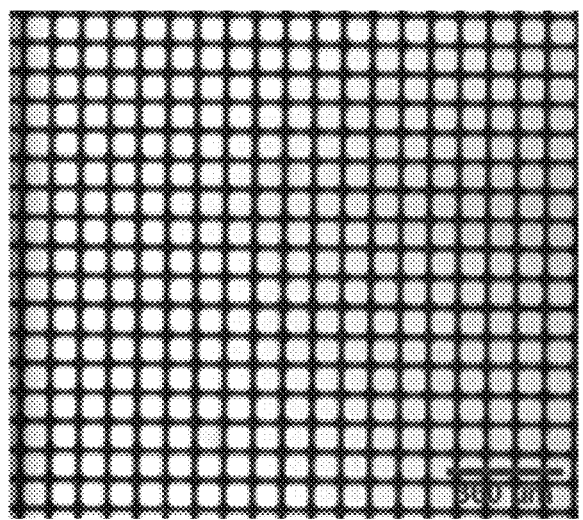
FIG. 7A is a top view of sub-wells of a well plate according to one embodiment of the invention.
Figure 7B:
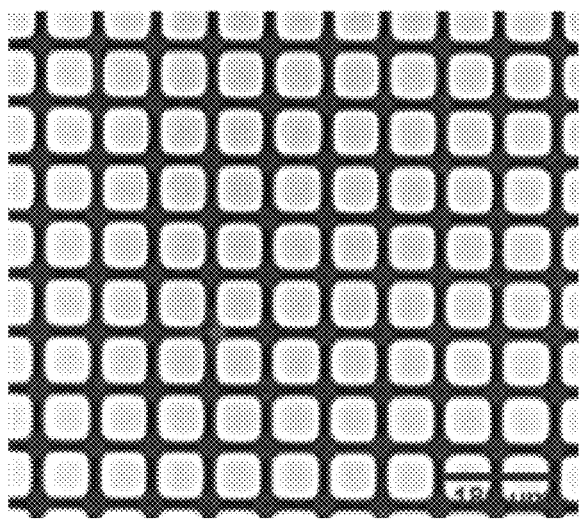
FIG. 7B is a further magnified view of the well plate of FIG. 7A.
Figure 7C:
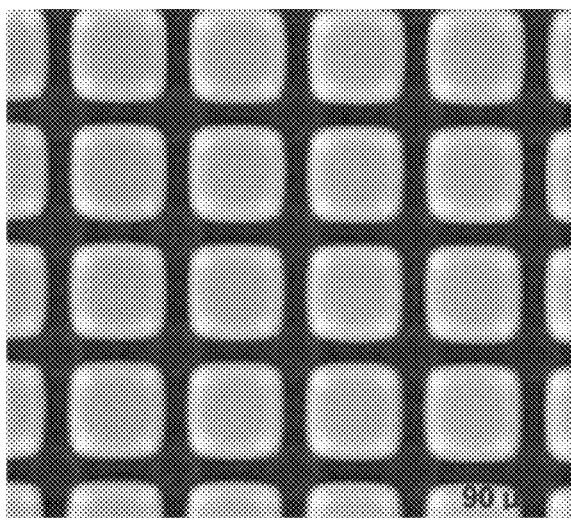
FIG. 7C is a further magnified view of the well plate of FIG. 7A.

Likewise, it should be understood that while plate 10 is depicted as comprising 384 sub-wells 24 (i.e., 16 sub-wells 24 in each well 18), this is not mandatory and plate 10 could comprise any suitable number of sub-wells 24 in each well 18 such as, for example, between approximately 16 and 10,000 sub-wells 24 in each well 18. Further, while sub-wells 24 are depicted as being square in shape (in the XY-plane), this is not mandatory and it should be understood that sub-wells 24 may be of any suitable shape such as a rounded shape, a circular shape, another polygonal shape, etc. For example, FIGS. 7A, 7B and 7C depict sub-wells 24 that are generally square in shape but with rounded corners (in the XY-plane).

Secondary structure 22 may comprise any suitable material. In some embodiments, secondary structure 22 comprises a light-absorbing material. In some embodiments, secondary structure 22 comprises a light-absorbing material that absorbs between approximately 90% to 100% of incident light. In some embodiments, secondary structure 22 comprises a light-absorbing material that absorbs more than approximately 99% of incident light. In some embodiments, secondary structure 22 is black in colour. Where secondary structure 22 is black in colour, the high-contrast difference in colour between secondary structure 22 and the bottom surface of sub-wells 24 (e.g., substrate 12) facilitates segmenting sub-wells 24 thereby facilitating automated analysis of plate 10 and its contents. In some embodiments, a factor of contrast (or contrast ratio) between secondary structure 22 and substrate 12 is between approximately 2× to 10× in the spectrum of visible light. In some embodiments, a factor of contrast (or contrast ratio) between secondary structure 22 and substrate 12 is between approximately 3.5× to 7.5× in the spectrum of visible light. In some embodiments, the material of secondary structure 22 is non-autofluorescent (e.g., the material does not exhibit auto-fluorescence).

In some embodiments, secondary structure 22 comprises a polymeric material. In some embodiments, secondary structure 22 comprises a hydrogel. In some embodiments, secondary structure 22 comprises a polymerized solid. In some embodiments, secondary structure 22 comprises a hydrogel or polymerized solid material fabricated from a plurality of precursor components. In some embodiments, the precursor components comprise a structural precursor, a viscosity modifying precursor, a photo-initiator precursor and a pigment precursor. In some embodiments, the precursor components may optionally comprise a surface modifying precursor.

The structural precursor may comprise any suitable structural precursor. In some embodiments, the structural precursor comprises an acrylate-terminated polymer. In some embodiments, the structural precursor comprises an acrylate-terminated polymer with a molecular weight of between approximately 100 g/mol and 50,000 g/mol. In some embodiments, the structural precursor comprises an acrylate-terminated polymer with a molecular weight of between approximately 100 g/mol and 1,000 g/mol. In some embodiments, the structural precursor comprises diurethane dimethacrylate (such as that available from Sigma-Aldrich™ under the product number 436909). In some embodiments, the structural precursor additionally or alternatively comprises one or more of bisphenol A-glycidyl methacrylate (BisGMA), trethane diacrylate (UDA), urethane dimethacrylate (UDMA), poly(methyl methacrylate) (PMMA), poly(methyl acylate) (PMA) and polyethylene glycol diacrylate (PEGDA). The structural precursor may provide the rigid structure of sub-walls 20, assist in maintaining the structural integrity of secondary structure 22 and/or minimize swelling of secondary structure 22 during use of plate 10.

The viscosity modifying precursor may comprise any suitable viscosity modifying precursor. In some embodiments, the viscosity modifying precursor comprises a methacrylate-terminated polymer. In some embodiments, the viscosity modifying precursor comprises a methacrylate-terminated polymer with a molecular weight of between approximately 50 to 1,000 g/mol. In some embodiments, the viscosity modifying precursor comprises a methacrylate-terminated polymer with a molecular weight of between approximately 50 to 100 g/mol. In some embodiments, the viscosity modifying precursor comprises a monomeric methacrylate. In some embodiments, the viscosity modifying precursor comprises a polyfunctional (meth)acrylate monomer. In some embodiments, the viscosity modifying precursor comprises 2-hydroxyethyl methacrylate (such as that available from Sigma-Aldrich™ under the product number 477028). In some embodiments, the viscosity modifying precursor additionally or alternatively comprises one or more of ethylene glycol dimethacrylate, diethylene glycol dimethacrylate, triethylene glycol dimethacrylate, polyethylene glycol dimethacrylate, 2.2 bis4(methacryloxyethoxy) phenylpropane, tricylodecane dimethanol dimethacrylate, 1,10-decandiol dimethacrylate, 1.6-hexanediol dimethacyrlate, 1.9-nonanediol dimethacrylate, neopentylglycol dimethacrylate, 2-hydroxy 1-3 dimethacryloxyproane, trimethyolpropane trimethacrylate, ethoxylated trimethyol propane trimethacrylate, ditrimethyolpropane tetramethacrylate, tris (2-hydroxy ethyl) isocyanurate trimethacrylate, dipentaerythritol pentamethacrylate, ethyoxylated pentaerythritol tetramethacrylate, propoxylatedglyceryl trimethacrylate, propoxylated trimethylolpropane trimethacrylate and polyester dendrimer. The viscosity modifying precursor may reduce viscosity thereby facilitating manufacturing.

The photo-initiator precursor may comprise any suitable photo-initiator precursor. In some embodiments, the photo-initiator precursor comprises a methacrylate-terminated polymer. In some embodiments, the photo-initiator precursor comprises a methacrylate-terminated polymer with a molecular weight of between approximately 100 g/mol and 600 g/mol. In some embodiments, the photo-initiator precursor comprises diphenyl(2,4,6-trimethylbenzoyl) phosphine oxide (such as that available from Sigma-Aldrich™ under the product number 415952). In some embodiments, the photo-initiator precursor additionally or alternatively comprises one or more of Ciba™ IRGACURE™ 819, 2,4,6-trimethylbenzoyl diphenyl phosphine, 2-hydroxy-2-methyl-1-phenyl-1-propan and benzophenone. The photo-initiator precursor may facilitate triggering UV activated bonding.

The pigment precursor may comprise any suitable pigment precursor. In some embodiments, the pigment precursor comprises a light-absorbing compound. In some embodiments, the pigment precursor comprises a light-absorbing compound that absorbs between approximately 90% to 100% of incident light. In some embodiments, the pigment precursor comprises a light-absorbing compound that absorbs more than approximately 99% of incident light. In some embodiments, the pigment precursor comprises a black dye or black pigment. In some embodiments, the pigment precursor comprises carbon black. In some embodiments, the pigment precursor additionally or alternatively comprises one or more of ivory black pigment, bone black pigment, mars black pigment, lamp black pigment, Sigma-Aldrich™ Sudan Black B staining system, Sigma-Aldrich™ Brilliant Black BN and other black pigments. The pigment precursor may provide a black appearance to sub-walls 20, help to suppress undesirable background fluorescence during use of plate 10 and/or control the depth of UV light for polymerization thereby controlling the Z-direction height, $h_{sw}$, of sub-walls 20, as discussed further herein. Further, the pigment precursor may increase the contrast of secondary structure 22 as compared to cells and/or substrate 12 thereby facilitating the analysis of photographs of plate 10 and cells therein.

The optional surface modifying precursor may comprise any suitable surface modifying precursor. For example, the surface modifying precursor may comprise one or more of polyethylene glycol diacrylate (PEGDA) having a polymer chain length of between approximately 250 and 20,000 and 1H, 1H,2H,2H-perfluorooctyltriethoxysilane. The surface modifying precursor may increase the hydrophobicity of sub-walls 20 thereby reducing undesirable cell adhesion to sub-walls 20.

The material of secondary structure 22 may be formed by combining and mixing the precursors. The precursors may be combined to achieve between approximately 40% (by weight) to 99.5% (by weight) of the weight of the structural precursor, between approximately 5% (by weight) to 60% (by weight) of the weight of the viscosity modifying precursor, between approximately 0.5% (by weight) to 5.0% (by weight) of the photo-initiator precursor, between approximately 0.01% (by weight) to 3.0% (by weight) of the pigment precursor.

The material of secondary structure 22 may optionally comprise between approximately 0% (by weight) to 20% (by weight) of surface modifying precursor 8E. More specifically, where the surface modifying precursor comprises PEGDA having a polymer chain length of between approximately 250 and 20,000, it may comprise between approximately 0% (by weight) to 20% (by weight) and where the surface modifying precursor comprises 1H,1H,2H,2H-perfluorooctyltriethoxysilane, it may comprise between approximately 0% (by weight) to 10% (by weight).

In a particular example, the material of secondary structure 22 is formed of 78.5% (by weight) of the structural precursor comprising diurethane dimethacrylate, 19.5% (by weight) of the viscosity modifying precursor comprising 2-hydroxyethyl methacrylate, 1.0% (by weight) of the photo-initiator precursor comprising diphenyl(2,4,6-trimethylbenzoyl) phosphine oxide and 1.0% (by weight) of the pigment precursor comprising carbon black.

In another particular example, the material of secondary structure 22 is formed of 77.0% (by weight) of the structural precursor comprising diurethane dimethacrylate, 18.0% (by weight) of the viscosity modifying precursor comprising 2-hydroxyethyl methacrylate, 4.0% (by weight) of the photo-initiator precursor comprising diphenyl(2,4,6-trimethylbenzoyl) phosphine oxide and 1.0% (by weight) of the pigment precursor comprising carbon black.

In another particular example, the material of secondary structure 22 is formed of 65.0% (by weight) of the structural precursor comprising diurethane dimethacrylate, 32.5% (by weight) of the viscosity modifying precursor comprising 2-hydroxyethyl methacrylate, 2.0% (by weight) of the photo-initiator precursor comprising diphenyl(2,4,6-trimethylbenzoyl) phosphine oxide and 0.5% (by weight) of the pigment precursor comprising carbon black.

In another particular example, the material of secondary structure 22 is formed of 40.0% (by weight) of the structural precursor comprising diurethane dimethacrylate, 53.0% (by weight) of the viscosity modifying precursor comprising 2-hydroxyethyl methacrylate, 5.0% (by weight) of the photo-initiator precursor comprising diphenyl(2,4,6-trimethylbenzoyl) phosphine oxide and 2.0% (by weight) of the pigment precursor comprising carbon black.

Secondary structure 22 may define sub-wells 24 having X-direction lengths, $l_{sw}$, of between approximately 5 μm and 1000 μm, Y-direction widths, $w_{sw}$, of between approximately 5 μm and 1000 μm, and Z-direction heights, $h_{sw}$, of between approximately 1 μm and 1000 μm. In some embodiments, a height-to-width ratio of sub-wells 24 is greater than 1:1 (e.g., a Z-direction height, $h_{sw}$, of sub-wells 24 is greater than a Y-direction width, $w_{sw}$, of sub-wells 24).

In some embodiments, one or more sub-wells 24 may be filled in to provide reference markers 24A when employing plate 10. In some embodiments, one or more sub-wells 24 in each well 18 may be filled in to provide reference markers 24A. Reference markers 24A may facilitate automated analysis of plate 10. Reference markers 24A may be arranged in particular patterns for easier recognition.

Figure 3:
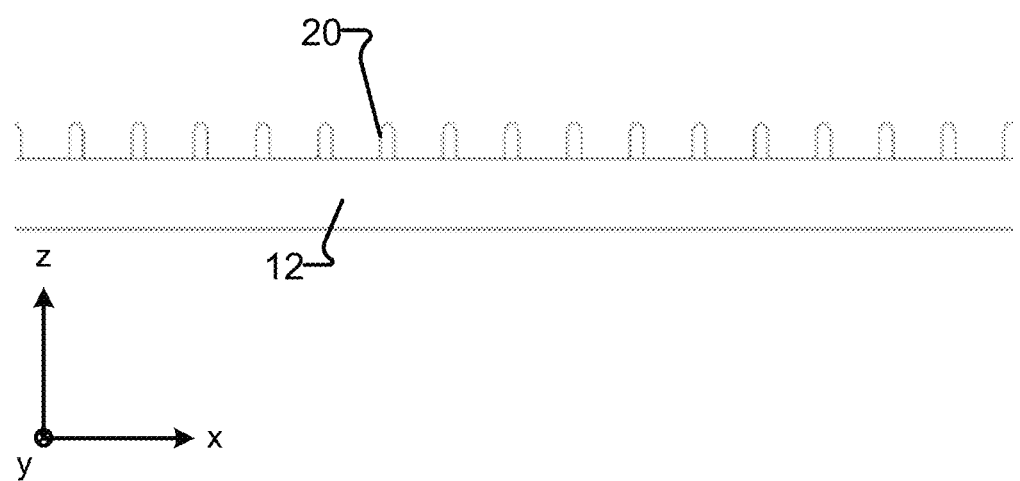
FIG. 3 is a side cross-sectional schematic depiction of a portion of an exemplary well plate according to an embodiment of the invention.

In some embodiments, a thickness of each sub-wall is between approximately 1 μm and 1,000 μm. In some embodiments, a thickness of each sub-wall is between approximately 75 μm and 100 μm. In some embodiments, a thickness of each sub-wall is between approximately 15 μm and 40 μm. In some embodiments, a thickness of each sub-wall is approximately 25 μm. While sub-walls 20 are depicted as having a constant cross-section (e.g., the X-direction dimension of sub-walls 20 depicted in FIG. 1B is shown as being constant along the entire Z-direction length of such sub-walls 20), this is not mandatory. Instead, the cross-section of sub-walls 20 may be tapered. For example, the cross-section of sub-walls 20 may be tapered such that the cross-section of sub-walls 20 is greater at locations relatively closer to substrate 12 as compared to the cross-section of sub-walls 20 at locations relatively further apart from substrate 12. In some embodiments, the rate at which the cross-section of sub-walls 20 tapers is linear but this is not mandatory and sub-walls 20 may taper in a non-linear manner (e.g., stepwise, exponentially, etc.). In some embodiments, the cross-section of sub-walls 20 begins tapering only near a distal end (e.g., away from substrate 12). FIG. 3 shows an exemplary sub-wall 20 that is tapered. This tapered shape of sub-walls 20 may direct cells towards the bottom of sub-wells 24 and mitigate a risk of cells being undesirably perched on top of sub-walls 20.

Figure 1D:
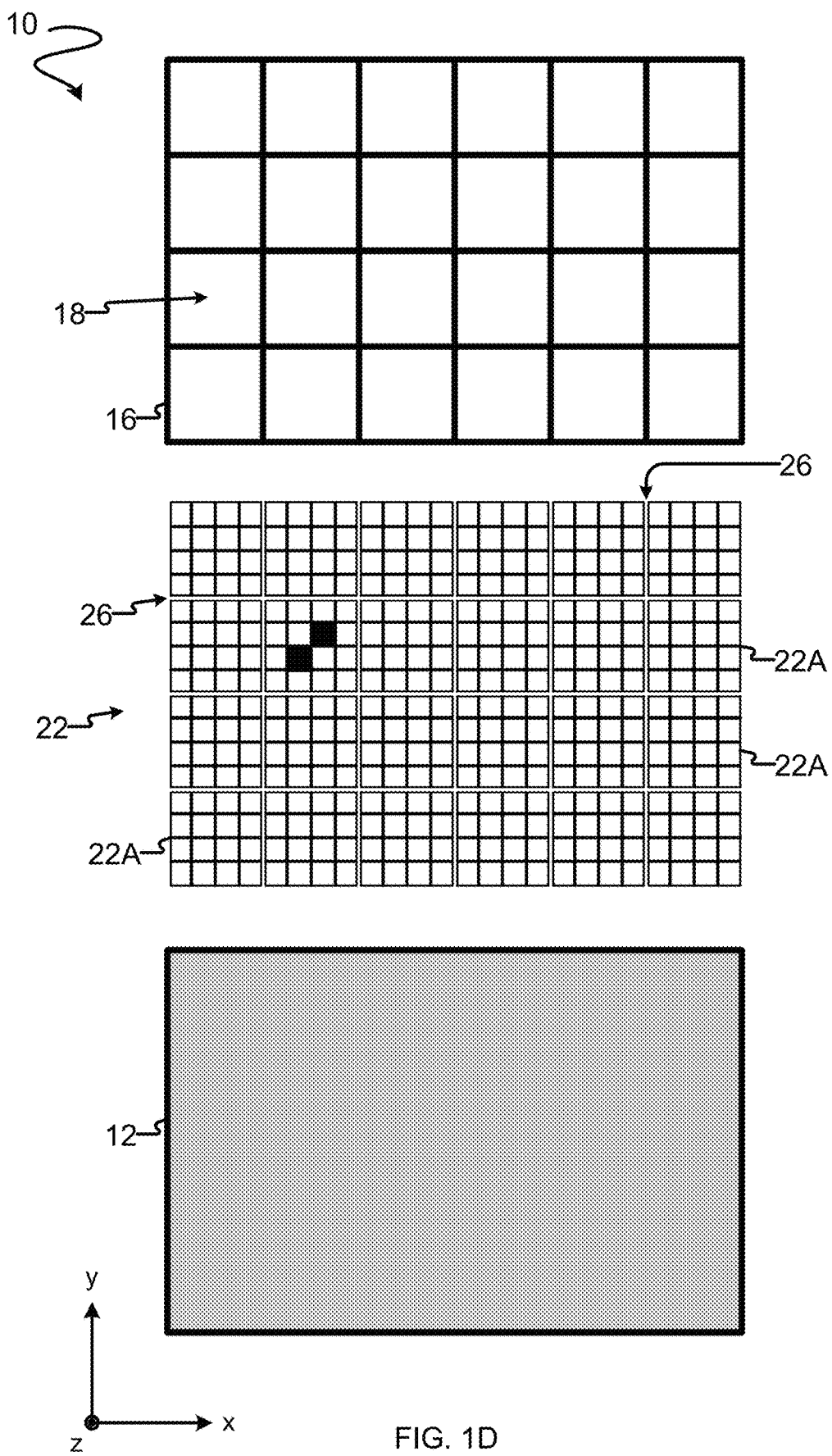
FIG. 1D is a top exploded schematic depiction of the well plate of FIG. 1A.

In some embodiments, walls 14 and sub-walls 20 are attached, adhered or formed directly onto substrate 12, such as is depicted in FIGS. 1A, 1B, 1C and 1D. Where walls 14 and sub-walls 20 are attached, adhered or formed directly onto substrate 12, sub-walls 20 may be shaped to define gaps 26 for receiving walls 14, such as is shown in FIG. 1D. Secondary structure 20 may therefore comprise a plurality of secondary sub-structures 22A separated from each other by gaps 26. Walls 14 of primary structure 16 may fit into gaps 26 thereby allowing walls 14 to be attached, adhered or formed directly onto substrate 12 without interference by sub-walls 20. In this way, sub-wells 24 defined by each secondary sub-structure 20A may be located within a single well 18 of primary structure 20. In embodiments where a Z-direction height, $h_w$, of a well 18 is greater than the Z-direction height, $h_{sw}$, of the sub-wells 24 within that well 18, fluids placed in the well 18 may be able to advantageously move or exchange between sub-wells 24 within that well 18 (e.g., without moving into sub-wells 24 inside an adjacent well 18).

FIGS. 2A, 2B, 2C and 2D are schematic depictions of a well plate 110 for imaging (referred to herein as plate 110) according to another example embodiment of the invention. It should be understood that FIGS. 2A, 2B, 2C and 2D are not to scale. Plate 110 is substantially similar to plate 10 except as discussed herein and like components have therefore been illustrated with reference numerals incremented by 100. For example, plate 110 comprises a substrate 112 (e.g. substantially similar to substrate 12), walls 114 (e.g., substantially similar to walls 14) defining a primary structure 116 (e.g., substantially similar to primary structure 16) having wells 118 (e.g., substantially similar to wells 18) and sub-walls 120 (e.g. substantially similar to sub-walls 20) defining a secondary structure 122 (e.g., substantially similar to secondary structure 22) having sub-wells 124 (e.g., substantially similar to sub-wells 24).

Figure 2A:
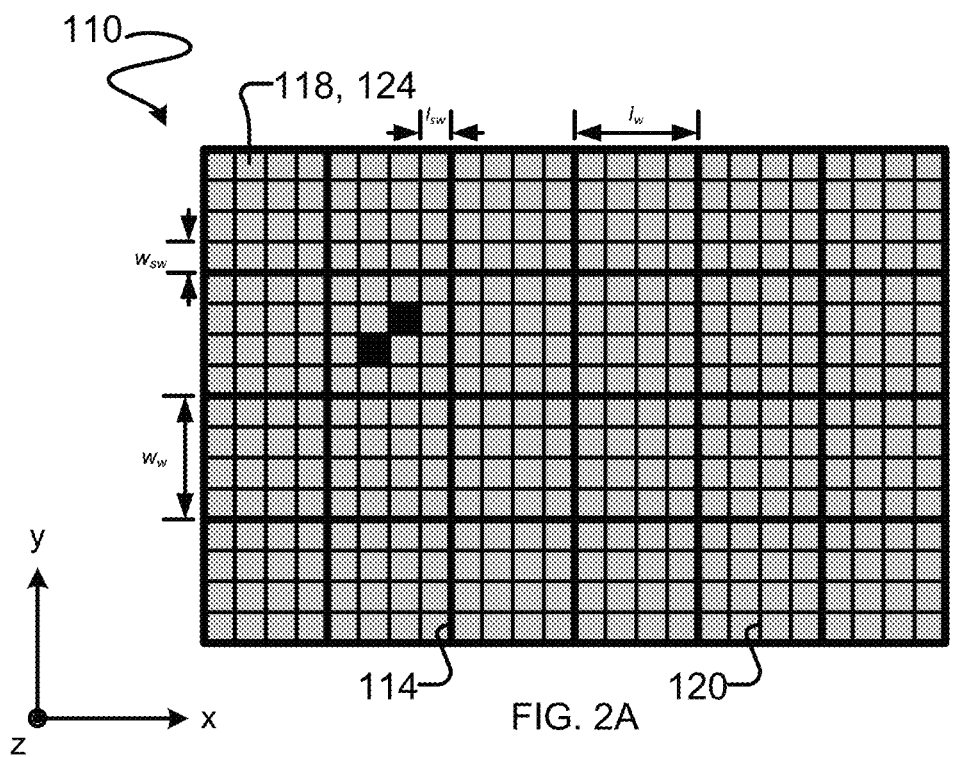
FIG. 2A is a top plan schematic depiction of an exemplary well plate according to an embodiment of the invention.
Figure 2B:
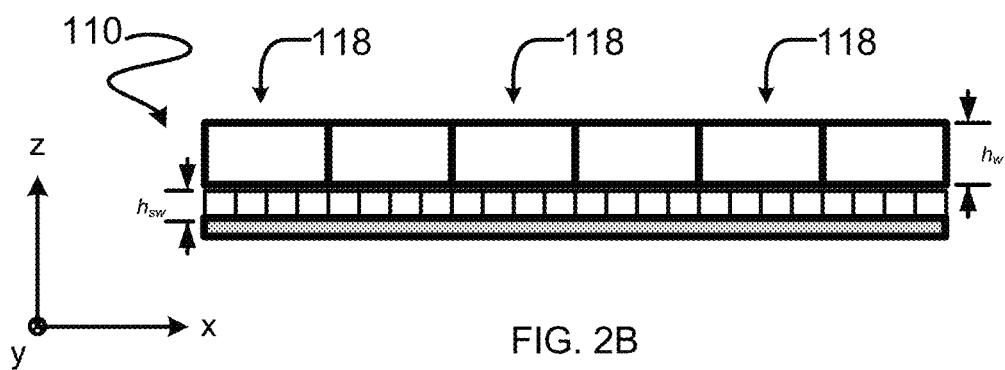
FIG. 2B is a side cross-section schematic depiction of the well plate of FIG. 2A.
Figure 2C:
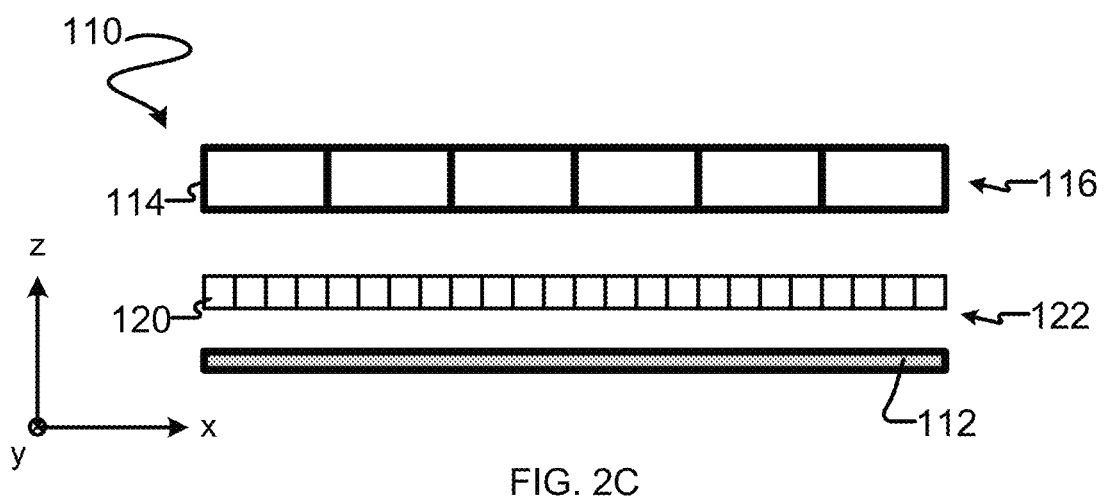
FIG. 2C is a side exploded schematic depiction of the well plate of FIG. 2A.
Figure 2D:
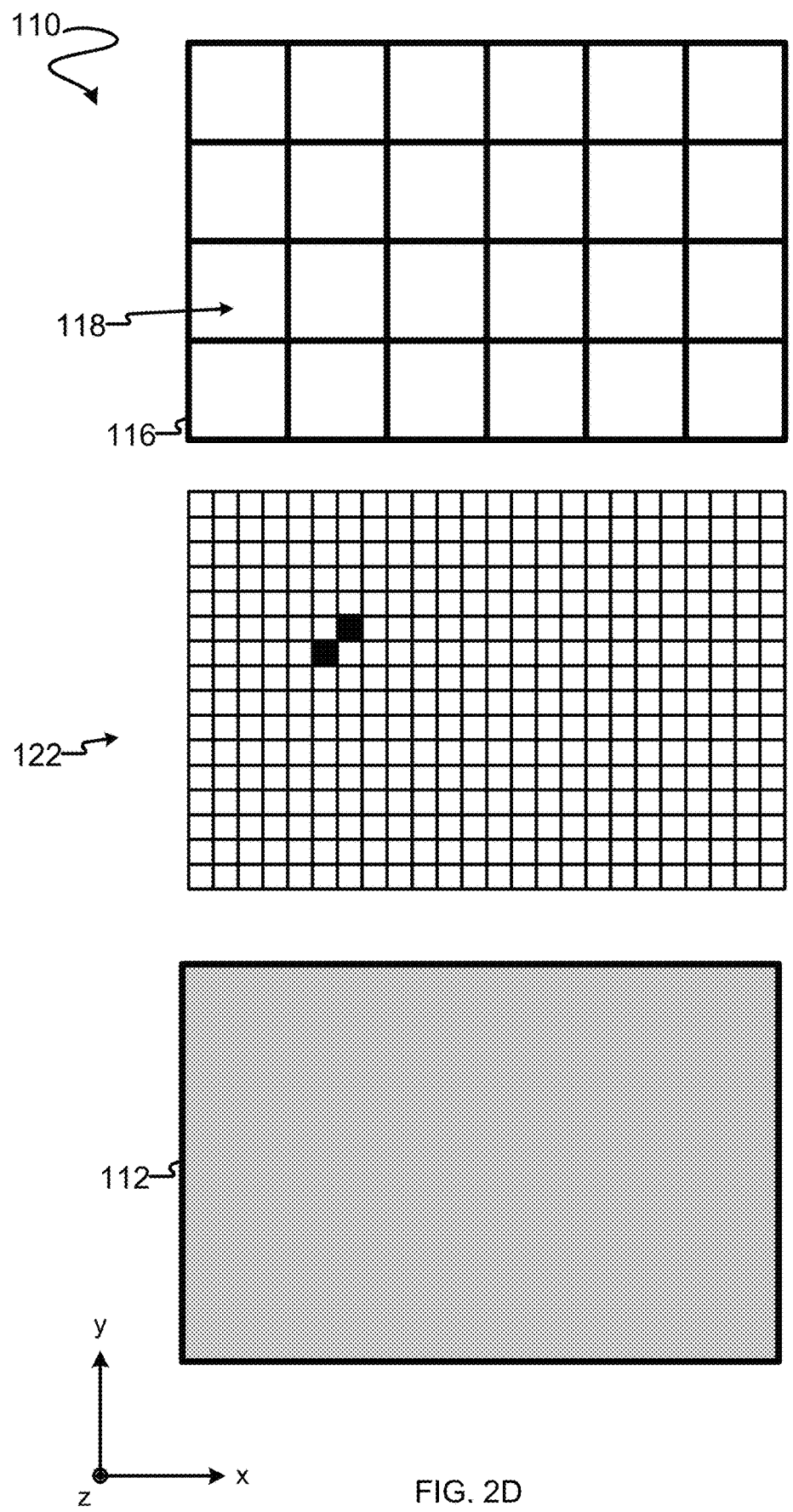
FIG. 2D is a top exploded schematic depiction of the well plate of FIG. 2A.

Unlike for plate 10, walls 114 are attached, adhered or formed onto sub-walls 120 rather than substrate 112 and, as such, gaps (e.g., like gaps 26) may not be present between sub-walls 20, such as is shown in FIG. 2D. As such, wells 118 are located above sub-wells 124. Nonetheless, wells 118 may allow fluid placed in the well 118 to advantageously move or exchange between sub-wells 124 under that well 118 (e.g., without moving to sub-wells 124 under an adjacent well 118).

For both plates 10 and 110, the bottom surface of wells 18, 118 and sub-wells 24, 124 is defined by substrate 12, 112 (e.g., rather than the bottom surface being defined secondary structure 22, 122) such that cells may be advantageously grown on substrate 12, 112 rather than on walls 14, 114 or sub-walls 20, 120. It may be desirable to image cellular material directly on a high-quality glass surface such as substrate 12, 112. The glass bottom surface may be desirable as compared to bottom surfaces of polymer material to facilitate high-quality imaging and ease of surface modification. Further, a glass bottom surface may be desirable because many cells preferentially attach to and grow on glass surfaces.

Plates 10, 110 may be employed in a number of applications in cell biology. For example plates 10, 110 may be employed to study single cells (e.g., single-cell drug-screening), grouped cells (e.g., CAR-T cytolysis, where single CAR-T cells are co-cultured with target cancer cells) and three-dimensional cell cultures (e.g., spheroid generation and screening).

Plates 10, 100 may be employed for post-experiment analysis using, for example, machine learning or artificial intelligence. The high contrast between sub-walls 20, 120 and the bottom of sub-wells 24, 124 (e.g., substrate 12, 112) facilitates segmentation between adjacent sub-wells 24, 124 thereby facilitating image extraction for individual sub-wells 24, 124 for analysis employing, for example, machine learning or artificial intelligence. Given the large number of sub-wells 24, 124 on a single plate 10, 110, large datasets (which are desirable for training machine learning and artificial intelligence models) may be obtained relatively quickly.

Another aspect of the invention provides methods to train and use a machine learning model to identify cellular features that may be otherwise unrecognizable by human perception. This may comprise acquiring images of cells within sub-wells 24 of plate 10 (or sub-wells 124 of plate 110). Such imaging may use known imaging modalities such as bright field microscopy or fluorescence microscopy. Assays may then be performed on the cells within sub-wells 24 of plate 10 (or sub-wells 124 of plate 110) to determine the phenotypes and properties of each cell. Potential cell phenotypes and properties include, for example, viability, propagation, motility, invasion, secretion, differentiation, protein localization, cell-cell interaction, and cell state change. These assays may involve adding and exchanging reagents to the cells. These assays may be destructive to the cells. Further images may then be acquired after the assay. Based on the location of each sub-well 24 within plate 10, the pre-assay images may be associated with the corresponding post-assay images. The associated images and determined phenotypes and properties of the depicted cells may then be employed to train a machine learning model (such as a convolutional neural network) to predict phenotypes and properties of cells from pre-assay images such that an assay may not be required at all to determine phenotypes and properties of cells.

This workflow could be used to predict cell death in order to perform drug screening without needing to use cell viability stains. Such a process could dramatically reduce reagent consumption, imaging requirements, and processing time for drug screening and testing. Additionally, cell viability stains can negatively affect cell viability, whereas imaging without additional staining may maintain cell viability. As a result, this process could enable drug screening to be performed at multiple time points on the same cells in order to identify both fast-acting and slow-acting drug compounds. This workflow could also be used to identify cell morphologies associated with specific cell properties. The identified morphologies could then be used to separate cells with specific properties. This workflow could also be used to identify cancerous cells from non-cancerous cells in a cell suspension, as well as to estimate the total fraction of cancerous cells. This workflow could also be used to identify efficacious therapeutic cells from non-efficacious therapeutic cells in a cell suspension, as well as to estimate the total fraction of efficacious therapeutic cells. This workflow could also be used to identify productive cells from non-productive cells in a cell suspension used in bio-manufacturing, as well as to estimate the total fraction of productive cells.

Figure 4:
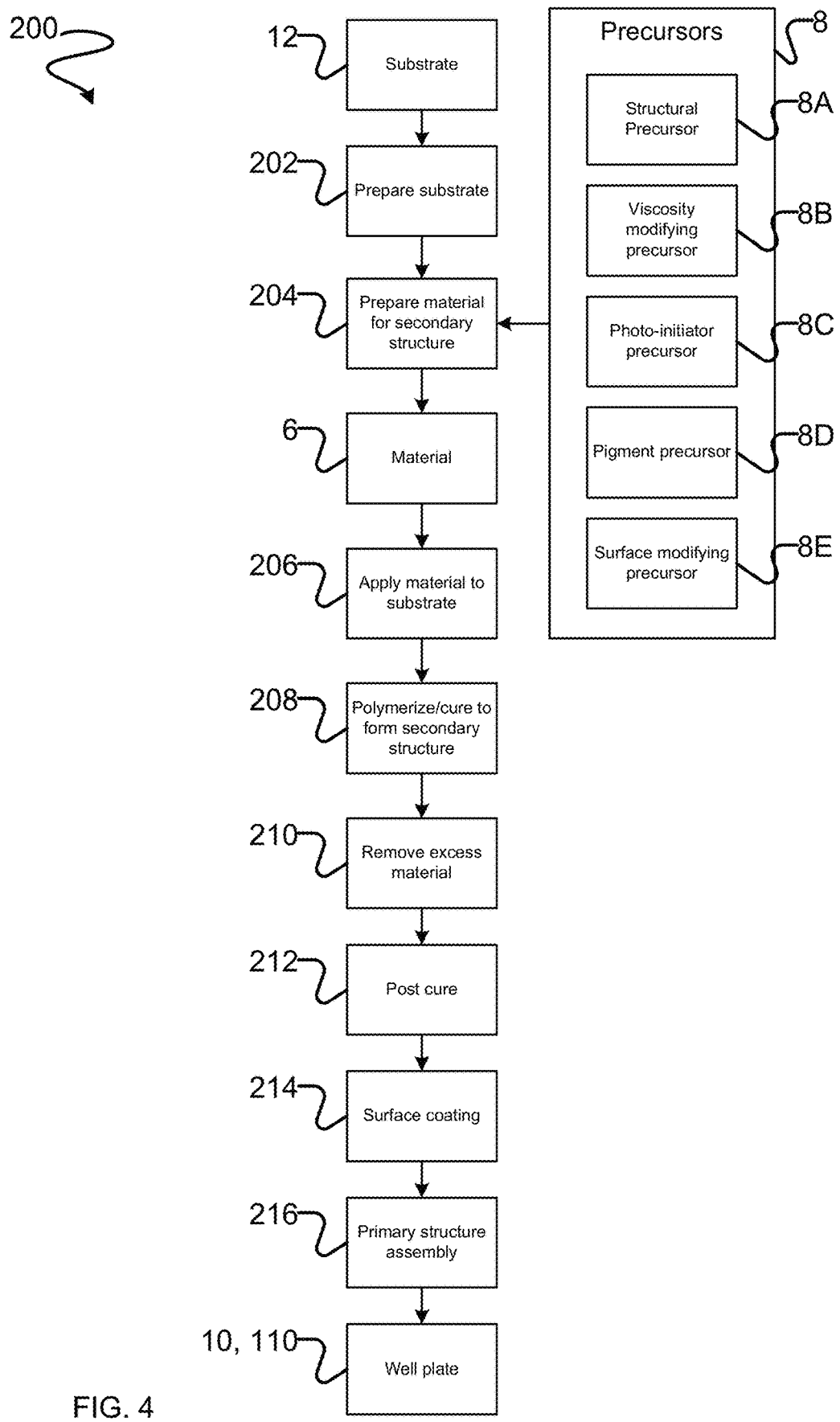
FIG. 4 depicts an exemplary method of fabricating a well plate according to an embodiment of the invention.

Another aspect of the invention provides a method of fabricating well plates for imaging such as, for example, plate 10 and plate 110. FIG. 4 depicts a method 200 for fabricating well plates for imaging. For example, method 200 may be employed to fabricate plate 10 and/or plate 110. For convenience, method 200 is described in relation to plate

10. However, it should be understood that method 200 could be employed to fabricate plate 110 or other well plates for imaging.

Method 200 may start at block 202. At block 202, substrate 12 may be prepared. Preparing substrate 12 may comprise cleaning and/or silanization of substrate 12. Cleaning of substrate 12 may occur prior to method 200. Likewise, silanization of substrate 12 may occur prior to method 200.

In some embodiments, one or more surfaces of substrate 12 are cleaned at block 202. Substrate 12 may be cleaned in any suitable manner. For example, substrate 12 may be cleaned with one or more of acetone, ethanol, plasma cleaner, piranha solution (a mixture of sulfuric acid and hydrogen peroxide) or the like. In some embodiments, substrate 12 is cleaned in acetone for approximately 10 minutes. In some embodiments, cleaning of substrate 12 occurs in a sonication bath. In some embodiments, substrate 12 is rinsed after cleaning. In some embodiments, substrate 12 is rinsed with isopropanol. In some embodiments, substrate 12 is rinsed with isopropanol for approximately 10 minutes. After rinsing, substrate 12 may be dried. In some embodiments, substrate 12 is dried with nitrogen or by placing substrate 12 in a drying oven. In some embodiments, substrate 12 is then cleaned inside of a plasma cleaning chamber. In some embodiments, substrate 12 is then cleaned inside of a plasma cleaning chamber for approximately 3 minutes.

In some embodiments, block 202 comprises silanization of substrate 12. Silanization of substrate 12 may coat at least one surface (e.g., first surface 12A) of substrate 12 in an organosilyl group. Silanization of substrate 12 may increase the hydrophobicity of the at least one surface of substrate 12. Silanization may reduce adherence of cells to substrate 12 (e.g., to first surface 12A of substrate 12). Silanization at block 202 may comprise any suitable method of silanization. In some embodiments, silanization at block 202 comprises liquid silanization, gas silanization and/or advanced silanization.

Liquid silanization may be achieved by any suitable method known in the art. For example, liquid silanization may be achieved by soaking substrate 12 in a silanization solution. The silanization solution may comprise a silanization agent such as, for example, an organosilane with as many as three hydrolysable substituents. The organosilane may have the structure of a trialkoxy, monoalkoxy, dipodal or polymeric silane which has been functionalized with an acrylate or methacrylate group. Example trialkoxy silanes include but are not limited to 3-acrylamidopropyltrimethoxysilane, n-(3-acryloxy-2-hydroxypropyl)-3-aminopropyltriethoxysilane, acryloxymethyltrimethoxysilane, (acryloxymethyl)phenethyltrimethoxysilane, (3-acryloxypropyl)trimethoxysilane, (3-methacrylamidopropyl)triethoxysilane, o-(methacryloxyethyl)-n-(triethoxysilylpropyl)carbamate, n-(3-methacryloxy-2-hydroxypropyl)-3-aminopropyltriethoxysilane, methacryloxymethyltriethoxysilane, methacryloxymethyltrimethoxysilane, methacryloxypropyltriethoxysilane, ethacryloxypropyltriisopropoxysilane, methacryloxypropyltrimethoxysilane and methacryloxypropyltris(methoxyethoxy) silane. Example dialkoxysilanes include but are not limited to (3-acryloxypropyl)methyldiethoxysilane, (3-acryloxypropyl)methyldimethoxysilane, (methacryloxymethyl)methyldiethoxysilane, (methacryloxymethyl)methyldimethoxysilane, methacryloxypropylmethyldiethoxysilane, methacryloxypropylmethyldimethoxysilane. Example monoalkoxysilanes include but are not limited to (3-acryloxypropyl)dimethylmethoxysilane, (methacryloxymethyl)dimethylethoxysilane, methacryloxypropyldimethylethoxysilane and methacryloxypropyldimethylmethoxysilane. Example polymeric silanes include but are not limited (3-acryloxypropyl)trimethoxysilane and methacryloxypropyltrimethoxysilane. The silanization solution may comprise, for example, 3-(Trimethoxysilyl) propyl methacrylate (TMSPMA) prepared at a concentration of 6% by weight in Ethanol. Substrate 12 may be treated with the silanization solution for between approximately 90 minutes and 150 minutes or for approximately 120 minutes at a temperature of between approximately 80° C. and 120° C. Substrate 112 may then be cleaned (e.g., in isopropanol) and dried (e.g., using nitrogen or a drying oven).

Gas silanization may be achieved by any suitable method known in the art. For example, gas silanization may be achieved by coating substrate 12 in a silanization agent in a gas state. The silanization agent may comprise, one or more of the foregoing silanization agents. The silanization agent may comprise for example, 3-(Trimethoxysilyl) propyl methacrylate (TMSPMA). This may be achieved, for example, by placing substrate 12 and a small volume of the silanization agent in a desiccator. The desiccator may then be pumped down to a vacuum pressure of approximately 20" Hg. The desiccator may be left at this pressure, with the exit valve closed, for a minimum of approximately 2 hours. The low pressure causes the silanization agent to evaporate, and fill the vacuum space, coating substrate 12. Afterwards substrate 12 may be cleaned (e.g. in isopropanol) and dried (e.g., using nitrogen or a drying oven).

Advanced silanization may be achieved by any suitable method known in the art. For example, advanced silanization may be achieved by first employing gas deposition using a silanization agent and then coating glutaraldehyde at 6% aqueous solution on substrate 12 at approximately 4° C. for approximately 4 hours. Substrate 12 may then be cleaned (e.g., in isopropanol), and dried (e.g., using nitrogen or a drying oven). Substrate 12 may then be coated with 0.1 g/L poly-d-lysine solution in a 0.01 M phosphate buffer solution (pH 8.0) at approximately 4° C. for approximately 24 hours. Substrate 12 may then be cleaned (e.g., in isopropanol), and dried (e.g., using nitrogen or a drying oven). The silanization agent may comprise an organosilane with as many as three hydrolysable substituents. The organosilane may have the structure of a trialkoxy, monoalkoxy or dipodal silane which has been functionalized with an amine group. Example trialkoxy silanes include but are not limited to 4-aminobutyltriethoxysilane, aminoneohexyltrimethoxysilane, n-(2-aminoethyl)-3-aminopropyltriethoxysilane, 3-(m-aminophenoxy) propyltrimethoxysilane, m-aminophenyltrimethoxysilane, p-aminophenyltrimethoxysilane, aminophenyltrimethoxysilane, 3-aminopropyltriethoxysilane, 11-aminoundecyltriethoxysilane, 2-(4-pyridylethyl)triethoxysilane, 2-(2-pyridylethyl)trimethoxysilane, n-(3-trimethoxysilylpropyl) pyrrole. Example dialkoxysilanes include but are not limited to 4-amino-3,3-dimethylbutylmethyldimethoxysilane and 3-aminopropylmethyldiethoxysilane. Example monoalkoxysilanes include but are not limited to 1-amino-2-(dimethylethoxysilyl) propane, 3-aminopropyldiisopropylethoxysilane and 3-aminopropyldimethylethoxysilane. The silanization agent may comprise (3-Aminopropyl)triethoxysilane.

At block 204, material 6 is prepared. Material 6 may be employed for fabricating secondary structure 22. In some embodiments, block 204 may occur before block 202. In some embodiments, block 204 may occur before method 200. Preparing material 6 may comprise mixing a plurality of precursor components 8. Mixing may occur by agitating precursors 8 together in a vessel. After mixing precursors 8 together, the mixture may be filtered to remove undesirable clumps. In some embodiments, the mixture is filtered through a 0.1 μm filter.

Precursor components 8 may comprise, for example a structural precursor 8A, a viscosity modifying precursor 8B, a photo-initiator precursor 8C and a pigment precursor 8D. In some embodiments, precursor components 8 may optionally comprise a surface modifying precursor 8E.

Structural precursor 8A may comprise any suitable structural precursor. In some embodiments, structural precursor 8A comprises an acrylate-terminated polymer. In some embodiments, structural precursor 8A comprises an acrylate-terminated polymer with a molecular weight of between approximately 100 g/mol and 50,000 g/mol. In some embodiments, structural precursor 8A comprises an acrylate-terminated polymer with a molecular weight of between approximately 100 g/mol and 1000 g/mol. In some embodiments, the viscosity modifying precursor comprises a monomeric methacrylate. In some embodiments, structural precursor 8A comprises diurethane dimethacrylate (such as that available from Sigma-Aldrich™ under the product number 436909). In some embodiments, structural precursor 8A additionally or alternatively comprises one or more of bisphenol A-glycidyl methacrylate (BisGMA), trethane diacrylate (UDA), urethane dimethacrylate (UDMA), poly(methyl methacrylate) (PMMA), poly(methyl acylate) (PMA) and polyethylene glycol diacrylate (PEGDA). Structural precursor 8A may provide the rigid structure of sub-walls 20, assist in maintaining the structural integrity of secondary structure 22 and/or minimize swelling of secondary structure 22 during use of plate 10.

Viscosity modifying precursor 8B may comprise any suitable viscosity modifying precursor. In some embodiments, viscosity modifying precursor 8B comprises a methacrylate-terminated polymer. In some embodiments, viscosity modifying precursor 8B comprises a methacrylate-terminated polymer with a molecular weight of between approximately 50 g/mol to 1,000 g/mol. In some embodiments, viscosity modifying precursor 8B comprises a methacrylate-terminated polymer with a molecular weight of between approximately 50 g/mol to 100 g/mol. In some embodiments, viscosity modifying precursor 8B comprises a monomeric methacrylate. In some embodiments, viscosity modifying precursor 8B comprises a polyfunctional (meth) acrylate monomer. In some embodiments, viscosity modifying precursor 8B comprises 2-hydroxyethyl methacrylate (such as that available from Sigma-Aldrich™ under the product number 477028). In some embodiments, viscosity modifying precursor 8B additionally or alternatively comprises one or more of ethylene glycol dimethacrylate, diethylene glycol dimethacrylate, triethylene glycol dimethacrylate, polyethylene glycol dimethacrylate, 2.2 bis4 (methacryloxyethoxy)phenylpropane, tricylodecane dimethanol dimethacrylate, 1,10-decandiol dimethacrylate, 1.6-hexanediol dimethacrylate, 1.9-nonanediol dimethacrylate, neopentylglycol dimethacrylate, 2-hydroxy 1-3 dimethacryloxyproane, trimethyolpropane trimethacrylate, ethoxylated trimethyol propane trimethacrylate, ditrimethyolpropane tetramethacrylate, tris(2-hydroxy ethyl) isocyanurate trimethacrylate, dipentaerythritol pentamethacrylate, ethyoxylated pentaerythritol tetramethacrylate, propoxylatedglyceryl trimethacrylate, propoxylated trimethylolpropane trimethacrylate and polyester dendrimer. Viscosity modifying precursor 8B may reduce viscosity thereby facilitating manufacturing.

Photo-initiator precursor 8C may comprise any suitable photo-initiator precursor. In some embodiments, photo-initiator precursor 8C comprises a methacrylate-terminated polymer. In some embodiments, photo-initiator precursor 8C comprises a methacrylate-terminated polymer with a molecular weight of between approximately 100 g/mol and 600 g/mol. In some embodiments, photo-initiator precursor 8C comprises diphenyl(2,4,6-trimethylbenzoyl) phosphine oxide (such as that available from Sigma-Aldrich™ under the product number 415952). In some embodiments, photo-initiator precursor 8C additionally or alternatively comprises one or more of Ciba™ IRGACURE™ 819, 2,4,6-trimethylbenzoyl diphenyl phosphine, 2-hydroxy-2-methyl-1-phenyl-1-propan and benzophenone. Photo-initiator precursor 8C may facilitate triggering UV activated bonding.

Pigment precursor 8D may comprise any suitable pigment precursor. In some embodiments, pigment precursor 8D comprises a light-absorbing compound. In some embodiments, pigment precursor 8D comprises a light-absorbing compound capable of absorbing between approximately 90% and 100% of incident light. In some embodiments, pigment precursor 8D comprises a light-absorbing compound capable of absorbing greater than approximately 99% of incident light. In some embodiments, pigment precursor 8D comprises a black dye or black pigment. In some embodiments, pigment precursor 8D comprises carbon black. In some embodiments, pigment precursor 8D additionally or alternatively comprises one or more of ivory black pigment, bone black pigment, mars black pigment, lamp black pigment, Sigma-Aldrich™ Sudan Black B staining system, Sigma-Aldrich™ Brilliant Black BN and other black pigments. Pigment precursor 8D may provide a black appearance to sub-walls 20, help to suppress undesirable background fluorescence during use of plate 10 and/or control the depth of UV light for polymerization thereby controlling the Z-direction height, $h_{sw}$, of sub-walls 20, as discussed further herein.

The optional surface modifying precursor 8E may comprise any suitable surface modifying precursor. For example, surface modifying precursor 8E may comprise one or more of polyethylene glycol diacrylate (PEGDA) having a polymer chain length of between approximately 250 and 20,000 and 1H, 1H,2H,2H-perfluorooctyltriethoxysilane. Surface modifying precursor 8E may increase the hydrophobicity of sub-walls 20 thereby reducing undesirable cell adhesion to sub-walls 20.

At block 204, precursors 8 may be combined to achieve between approximately 40% (by weight) to 99.5% (by weight) of sweight) of structural precursor 8A, between approximately 5% (by weight) to 60% (by weight) of viscosity modifying precursor 8B, between approximately 0.5% (by weight) to 5.0% (by weight) of photo-initiator precursor 8C, between approximately 0.01% (by weight) to 3.0% (by weight) of pigment precursor 8D and optionally between approximately 0% (by weight) to 20% (by weight) of sweight) of surface modifying precursor 8E. More specifically, where surface modifying precursor 8E comprises PEGDA having a polymer chain length of between approximately 250 and 20,000, it may comprise between approximately 0% (by weight) to 20% (by weight) and where surface modifying precursor 8E comprises 1H,1H,2H,2H-perfluorooctyltriethoxysilane, it may comprise between approximately 0% (by weight) to 10% (by weight).

Precursors 8 may be combined at block 204 to achieve 78.5% (by weight) of sweight) of structural precursor 8A comprising diurethane dimethacrylate, 19.5% (by weight) of viscosity modifying precursor 8B comprising 2-hydroxyethyl methacrylate, 1.0% (by weight) of photo-initiator precursor 8C comprising diphenyl(2,4,6-trimethylbenzoyl) phosphine oxide and 1.0% (by weight) of pigment precursor 8D comprising carbon black.

In another particular example, precursors 8 may be combined at block 204 to achieve 77.0% (by weight) of sweight) of structural precursor 8A comprising diurethane dimethacrylate, 18.0% (by weight) of viscosity modifying precursor 8B comprising 2-hydroxyethyl methacrylate, 4.0% (by weight) of photo-initiator precursor 8C comprising diphenyl (2,4,6-trimethylbenzoyl) phosphine oxide and 1.0% (by weight) of pigment precursor 8D comprising carbon black.

In another particular example, precursors 8 may be combined at block 204 to achieve 65.0% (by weight) of sweight) of structural precursor 8A comprising diurethane dimethacrylate, 32.5% (by weight) of viscosity modifying precursor 8B comprising 2-hydroxyethyl methacrylate, 2.0% (by weight) of photo-initiator precursor 8C comprising diphenyl (2,4,6-trimethylbenzoyl) phosphine oxide and 0.5% (by weight) of pigment precursor 8D comprising carbon black.

In another particular example, precursors 8 may be combined at block 204 to achieve 40.0% (by weight) of structural precursor 8A comprising diurethane dimethacrylate, 53.0% (by weight) of viscosity modifying precursor 8B comprising 2-hydroxyethyl methacrylate, 5.0% (by weight) of photo-initiator precursor 8C comprising diphenyl(2,4,6-trimethylbenzoyl) phosphine oxide and 2.0% (by weight) of pigment precursor 8D comprising carbon black.

Block 206 may comprise applying a layer 28 (e.g., a thin film) of material 6 to first surface 12A of substrate 12. Layer 28 of material 6 may be applied by any suitable technique. Since the Z-direction thickness of layer 28 is not determinative of the desired Z-direction height, $h_{sw}$, of sub-walls 20, a precision of the Z-direction thickness of layer 28 may be less important. For example, it may be sufficient that the Z-direction thickness of layer 28 is greater or equal to the desired Z-direction height, $h_{sw}$, of sub-walls 20. As such, simple, inexpensive methods such as dipping or applying material 6 with a brush (or the like) may be employed to apply layer 28 to substrate 12 at block 206. This is advantageous since, it allows for substrate 12 to have a non-circular shape (e.g., rectangular shape) in the XY-plane. In contrast, previous commonly employed methods of fabrication which relied on spin-coating to achieve a desired well height are not suited to achieve a consistent coating thickness near the edges of a non-circular substrate and therefore such methods favoured round (e.g., circular) substrates which are otherwise undesirable. That being said, other methods such as, for example, spin-coating may still be employed to apply layer 28 to substrate 12, if desired.

At block 208, at least a portion of material 6 of layer 28 is cured or polymerized to form secondary structure 22. Cured or polymerized material 6 may comprise, for example, a polymeric material such as a hydrogel. Cured or polymerized material 6 may comprise, for example, a polymeric material such as a polymerized solid. Cured or polymerized material 6 may comprise a light-absorbing material. Cured or polymerized material 6 may absorb between approximately 90% and 100% of incident light. Cured or polymerized material 6 may absorb more than approximately 99% of incident light. Cured or polymerized material 6 may be black in colour. Cured or polymerized material 6 may be non-auto-fluorescent.

Polymerization or curing of material 6 at block 208 may be effected by, for example, exposure of material 6 to ultraviolet light. For example, in some embodiments, ultraviolet light 30A from a light source 30 may be directed at layer 28 to cure or polymerize material 6 thereby forming secondary structure 22. Ultraviolet light 30A may be collimated, highly collimated or substantially collimated.

Figure 5:
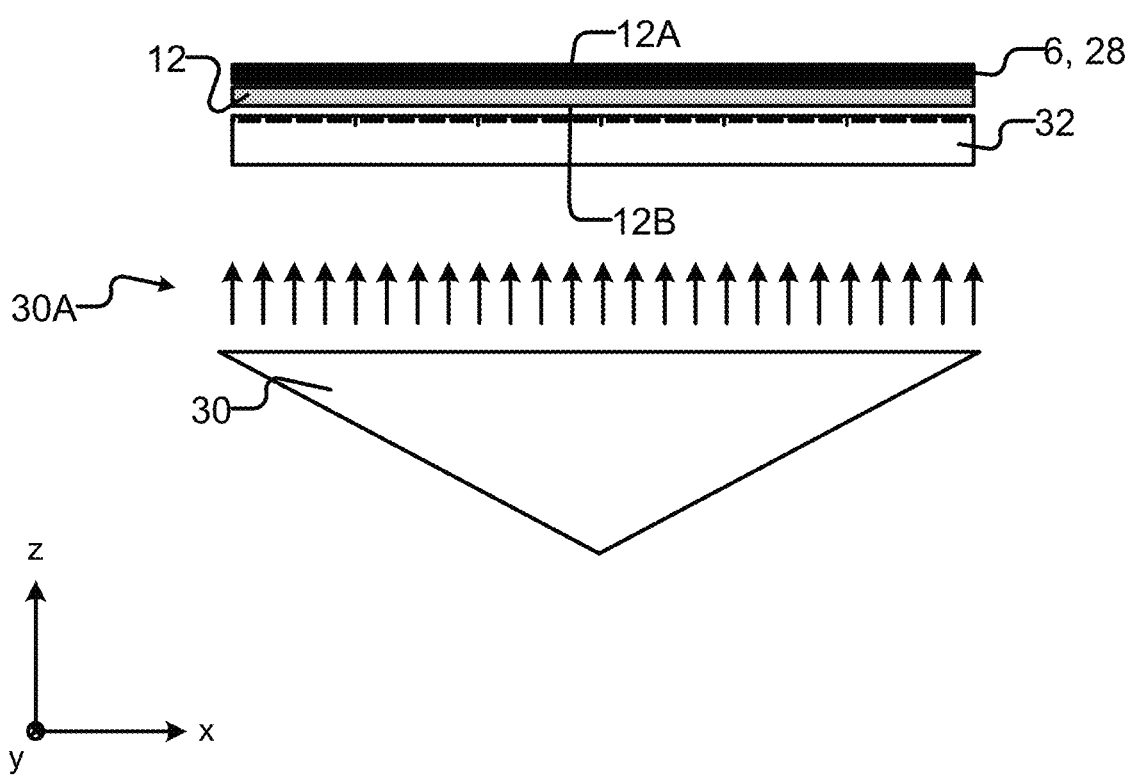
FIG. 5 is a schematic depiction of a portion of the method of FIG. 4.

In some embodiments, ultraviolet light source 30A is located facing a second surface 12B of substrate 12 (e.g., opposite first surface 12A) such that ultraviolet light 30A passes through substrate 12 to reach material 6 of layer 28, as shown in FIG. 5. In this way, material 6 polymerizes starting from nearest to the substrate (e.g., upwards from the bottom in the depicted embodiment) as ultraviolet light 30A is applied to material 6 to ensure, for example, proper adhesion of secondary structure 22 to substrate 12 and/or to achieve a desired cross-sectional shape of each sub-wall 20.

In some embodiments, to achieve a desired shape of secondary structure 22, ultraviolet light 30A may be directed to pass through a photomask 32 before reaching material 6 in layer 28, such as is shown in FIG. 5. Photomask 32 may be located directly adjacent (e.g., touching second surface 12B of substrate 12) or may be spaced apart from substrate 12. Photomask 32 may comprise any suitable photomask. For example, photomask 32 may comprise borosilicate or fused silica with a chromium pattern 32A.

Figure 6:
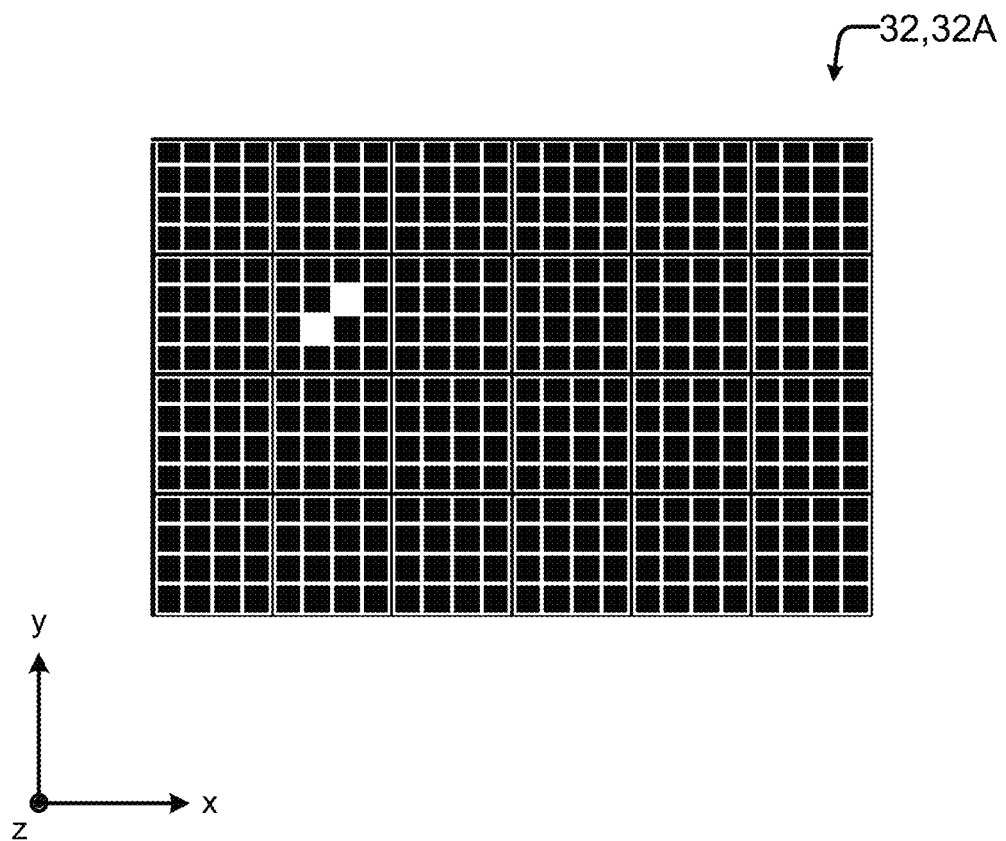
FIG. 6 is a schematic depiction of a photomask employable in the method of FIG. 4.

Pattern 32A of photomask 32 may match the shape of secondary structure 22. For example, FIG. 6 depicts a photomask 32 having a pattern 32A matching the shape of secondary structure 22, as shown in FIG. 1D. As the XY-plane shape of secondary structure 22 is dependent on pattern 32A, the XY-plane shape of secondary structure 22 may be easily changed by changing pattern 32A. For example, manufacturing plates 10 having different numbers of sub-wells 24 may be as simple as employing different photomasks 32 having different patterns 32A.

The Z-direction height, $h_{sw}$, of sub-walls 20 achieved at block 208 may be dependent at least in part on a composition of material 6. For example, as the relative amount of pigment precursor 8D in material 6 increases, ultraviolet light 30A may not penetrate as deeply into layer 28 and the Z-direction height, $h_{sw}$, of sub-walls 20 may decrease. On the other hand, as the relative amount of pigment precursor 8D in material 6 decreases, ultraviolet light 30A may be able to penetrate more deeply into layer 28 and the Z-direction height, $h_{sw}$, of sub-walls 20 may increase. In this way, the Z-direction height, $h_{sw}$, of sub-walls 20 may be controlled by controlling amount of pigment precursor 8D in material 6. As another example, as the relative amount of photo-initiator precursor 8C in material 6 increases, material 6 may polymerize more readily and the Z-direction height, $h_{sw}$, of sub-walls 20 may increase. On the other hand, as the relative amount of photo-initiator precursor 8C in material 6 decreases, material 6 may polymerize less readily and the Z-direction height, $h_{sw}$, of sub-walls 20 may decrease. In this way, the Z-direction height, $h_{sw}$, of sub-walls 20 may be controlled by controlling amount of photo-initiator precursor 8C in material 6.

The Z-direction height, $h_{sw}$, of sub-walls 20 achieved at block 208 may be dependent at least in part on the amount of time during which material 6 is exposed to ultraviolet light 30A at block 208. For example, as the amount of time during which material 6 is exposed to ultraviolet light 30A at block 208 increases, the Z-direction height, $h_{sw}$, of sub-walls 20 may increase and as the amount of time during which material 6 is exposed to ultraviolet light 30A at block 208 decreases, the Z-direction height, $h_{sw}$, of sub-walls 20 may decrease. This effect may be limited by the composition of material 6. For example, at some point, ultraviolet light 30A will not be able to penetrate any further into layer 28 due to the composition of material 6 even if material 6 is exposed to ultraviolet light 30A at block 208 for a longer period of time.

At block 210, excess material 6 (e.g., material 6 that has not polymerized) is removed from substrate 12. Excess material 6 may be removed by any suitable method. In some embodiments, alcohol or acetone is employed to remove excess material 6. For example, in some embodiments, substrate 12 (with polymerized material 6 and excess material 6) is soaked in isopropanol. For example, in other embodiments, substrate 12 (with polymerized material 6 and excess material 6) is soaked in acetone and then soaked in isopropanol. Once excess material 6 is removed, substrate 12 and secondary structure 22 remain. Substrate 12 (with polymerized material 6 but without excess material 6) may then be dried (e.g., using nitrogen or a drying oven).

At block 212, further curing of secondary structure 22 may optionally occur. For example, in some embodiments, substrate 12 (with polymerized material 6 but without excess material 6) is further exposed to ultraviolet light to increase the rigidity of sub-walls 20 and/or to ensure that the polymerization reaction of material 6 is complete. In some embodiments, the block 212 curing may take between approximately 10 minutes and 60 minutes. In some embodiments, substrate 12 (with polymerized material 6 but without excess material 6) may be heated to a temperature of between approximately 25° C. and 80° C. during the block 212 curing.

At block 214, one or more surfaces of secondary structure 22 may optionally be coated. For example, one or more surfaces of secondary structure 22 may be coated in a non-adherent solution to reduce adherence of cells to secondary structure 22 during use of plate 10. Examples of such non-adherent solutions include a diluted self assembling monolayer (SAM) and a silanization solution functionalized with PEG diluted in ethanol (20%) such as the BIO-FLOAT™ sold by faCEllitate™. Coating at block 214 may occur by soaking substrate 12 with secondary structure 22 in the non-adherent solution for between approximately 2 minutes and 60 minutes.

In some embodiments, at block 216, primary structure 16 is attached to substrate 12 to form plate 10. Primary structure 16 may be attached to substrate 12 by adhesive. The adhesive may comprise an ultraviolet light reactive adhesive (e.g., an adhesive that cures in response to exposure to ultraviolet light) or a heat reactive adhesive (e.g., an adhesive that cures in response to exposure to heat). In its uncured state, the adhesive may be in the form of, for example, a liquid or a tape. In some embodiments, adhesive is applied to substrate 12 and/or a bottom of primary structure 16 (e.g., the bottom of walls 14). A jig may be employed to align primary structure 16 with substrate 12 and/or secondary structure 22. For example, a jig may be employed to located walls 14 within gaps 26 defined by secondary structure 22.

The assembled plate 10 (e.g., comprising substrate 10, primary structure 16 and secondary structure 22) may then be cleaned and/or sterilized before use or being packaged for later use.

Where method 200 is employed to fabricate plate 110, method 200 may be substantially the same as described herein for fabricating plate 10 except that pattern 32A may match the shape of secondary structure 122 and at block 216, primary structure 116 is attached to secondary structure 122 rather than substrate 112.

Interpretation of Terms

Unless the context clearly requires otherwise, throughout the description and the "comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms. These terms ("a", "an", and "the") mean one or more unless stated otherwise;

"and/or" is used to indicate one or both stated cases may occur, for example A and/or B includes both (A and B) and (A or B);

where a feature is described as being "optional" or "optionally" present or described as being present "in some embodiments" it is intended that the present disclosure encompasses embodiments where that feature is present and other embodiments where that feature is not necessarily present and other embodiments where that feature is excluded. Further, where any combination of features is described in this application this statement is intended to serve as antecedent basis for the use of exclusive terminology such as "solely," "only" and the like in relation to the combination of features as well as the use of "negative" limitation(s)" to exclude the presence of other features; and "first" and "second" are used for descriptive purposes and cannot be understood as indicating or implying relative importance or indicating the number of indicated technical features.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Where a range for a value is stated, the stated range includes all sub-ranges of the range. It is intended that the statement of a range supports the value being at an endpoint of the range as well as at any intervening value to the tenth of the unit of the lower limit of the range, as well as any subrange or sets of sub ranges of the range unless the context clearly dictates otherwise or any portion(s) of the stated range is specifically excluded. Where the stated range includes one or both endpoints of the range, ranges excluding either or both of those included endpoints are also included in the invention.

Certain numerical values described herein are preceded by "about" or "approximately". In this context, "about" provides literal support for the exact numerical value that it precedes, the exact numerical value ±10%, as well as all other numerical values that are near to or approximately equal to that numerical value. Unless otherwise indicated a particular numerical value is included in "about" or "approximately" a specifically recited numerical value where the particular numerical value provides the substantial equivalent of the specifically recited numerical value in the context in which the specifically recited numerical value is presented. For example, a statement that something has the numerical value of "about 10" is to be interpreted as: the set of statements:

in some embodiments the numerical value is 10;
in some embodiments the numerical value is in the range of 9.0 to 11.0;

and if from the context the person of ordinary skill in the art would understand that values within a certain range are substantially equivalent to 10 because the values with the range would be understood to provide substantially the same result as the value 10 then "about 10" also includes:

in some embodiments the numerical value is in the range of C to D where C and D are respectively lower and upper endpoints of the range that encompasses all of those values that provide a substantial equivalent to the value 10.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

As will be apparent to those of skill in the art upon reading this disclosure, each of the individual embodiments described and illustrated herein has discrete components and features which may be readily separated from or combined with the features of any other described embodiment(s) without departing from the scope of the present invention.

Any aspects described above in reference to apparatus may also apply to methods and vice versa.

Any recited method can be carried out in the order of events recited or in any other order which is logically possible. For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, simultaneously or at different times.

Various features are described herein as being present in "some embodiments". Such features are not mandatory and may not be present in all embodiments. Embodiments of the invention may include zero, any one or any combination of two or more of such features. All possible combinations of such features are contemplated by this disclosure even where such features are shown in different drawings and/or described in different sections or paragraphs. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible). This is the case even if features A and B are illustrated in different drawings and/or mentioned in different paragraphs, sections or sentences.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

The invention claimed is:

1. A well plate comprising:
a substrate having opposing first and second surfaces;
a primary structure attached to the first surface of the substrate, the primary structure comprising a plurality of walls attached to and extending away from the first surface wherein the plurality of walls and the first surface of the substrate together define a plurality of wells; and
a light absorbent secondary structure attached to the first surface of the substrate, the secondary structure comprising, within each one of the plurality of the wells, a plurality of sub-walls attached to and extending away from the first surface wherein each plurality of sub-walls and the first surface of the substrate together define a plurality of sub-wells;
wherein a thickness of each sub-wall is greater at a first location than at a second location, wherein the second location is further from the first surface of the substrate than the first location is from the first surface of the substrate.

2. The well plate according to claim 1 wherein the plurality of walls define sidewalls of each of the wells and the first surface of the substrate defines a bottom of each of the wells.

3. The well plate according to claim 1 wherein the plurality of sub-walls define sidewalls of each of the sub-wells and the first surface of the substrate defines a bottom of each of the sub-wells.

4. The well plate according to claim 1 wherein a height of each of the plurality of sub-wells is less than a height of each of the plurality of wells.

5. The well plate according to claim 1 wherein a width of each of the wells is between approximately 0.8 mm and 120 mm.

6. The well plate according to claim 1 wherein a width of each of the sub-wells is between approximately 5 µm and 1,000 µm.

7. The well plate according to claim 1 wherein a height of each of the wells is between 1 mm and 20 mm and a height of each of the sub-wells is between 1 µm and 1,000 µm.

8. The well plate according to claim 1 wherein the substrate comprises glass.

9. The well plate according to claim 1 wherein the primary structure comprises an ANSI-dimensioned microwell plate.

10. The well plate according to claim 1 wherein the secondary structure comprises a polymerized solid.

11. A well plate comprising:
a substrate having opposing first and second surfaces;
a primary structure attached to the first surface of the substrate, the primary structure comprising a plurality of walls attached to and extending away from the first surface wherein the plurality of walls and the first surface of the substrate together define a plurality of wells; and
a light absorbent secondary structure attached to the first surface of the substrate, the secondary structure comprising, within each one of the plurality of the wells, a plurality of sub-walls attached to and extending away from the first surface wherein each plurality of sub-walls and the first surface of the substrate together define a plurality of sub-wells;
wherein the secondary structure comprises a hydrogel.

12. The well plate according to claim 1 wherein the secondary structure comprises a polymerized solid having a mixture of precursor components, the precursor components comprising a structural precursor, a viscosity modifying precursor, a photo-initiator precursor and a pigment precursor.

13. A well plate comprising:
a substrate having opposing first and second surfaces;
a primary structure attached to the first surface of the substrate, the primary structure comprising a plurality of walls attached to and extending away from the first surface wherein the plurality of walls and the first surface of the substrate together define a plurality of wells; and
a light absorbent secondary structure attached to the first surface of the substrate, the secondary structure comprising, within each one of the plurality of the wells, a plurality of sub-walls attached to and extending away from the first surface wherein each plurality of sub-walls and the first surface of the substrate together define a plurality of sub-wells;
wherein the secondary structure comprises a polymerized solid having a mixture of precursor components, the precursor components comprising a structural precursor, a viscosity modifying precursor, a photo-initiator precursor and a pigment precursor;
wherein the structural precursor comprises an acrylate-terminated polymer.

14. The well plate according to claim 12 wherein the structural precursor comprises diurethane dimethacrylate.

15. The well plate according to claim 12 wherein the structural precursor comprises one or more of diurethane dimethacrylate, bisphenol A-glycidyl methacrylate (Bis-GMA), trethane diacrylate (UDA), urethane dimethacrylate (UDMA), poly(methyl methacrylate) (PMMA), poly (methyl acylate) (PMA) and polyethylene glycol diacrylate (PEGDA).

16. The well plate according to claim 12 wherein the viscosity modifying precursor comprises a methacrylate-terminated polymer.

17. A well plate comprising:
a substrate having opposing first and second surfaces;
a primary structure attached to the first surface of the substrate, the primary structure comprising a plurality of walls attached to and extending away from the first surface wherein the plurality of walls and the first surface of the substrate together define a plurality of wells; and
a light absorbent secondary structure attached to the first surface of the substrate, the secondary structure comprising, within each one of the plurality of the wells, a plurality of sub-walls attached to and extending away from the first surface wherein each plurality of sub-walls and the first surface of the substrate together define a plurality of sub-wells;
wherein the secondary structure comprises a polymerized solid having a mixture of precursor components, the precursor components comprising a structural precursor, a viscosity modifying precursor, a photo-initiator precursor and a pigment precursor;
wherein the pigment precursor comprises a light-absorbing compound which absorbs between approximately 90% and 100% of incident light.

18. A well plate comprising:
a substrate having opposing first and second surfaces;
a primary structure attached to the first surface of the substrate, the primary structure comprising a plurality of walls attached to and extending away from the first surface wherein the plurality of walls and the first surface of the substrate together define a plurality of wells; and
a light absorbent secondary structure attached to the first surface of the substrate, the secondary structure comprising, within each one of the plurality of the wells, a plurality of sub-walls attached to and extending away from the first surface wherein each plurality of sub-walls and the first surface of the substrate together define a plurality of sub-wells;
wherein the secondary structure comprises a polymerized solid having a mixture of precursor components, the precursor components comprising a structural precursor, a viscosity modifying precursor, a photo-initiator precursor and a pigment precursor;
wherein the pigment precursor comprises a black pigment.

19. The well plate according to claim 12 wherein the mixture of precursor components comprises:
between approximately 40% (by weight) to 99.5% (by weight) of the structural precursor,
between approximately 5% (by weight) to 60% (by weight) of the viscosity modifying precursor,
between approximately 0.5% (by weight) to 5.0% (by weight) of the photo-initiator precursor, and
between approximately 0.01% (by weight) to 3.0% (by weight) of the pigment precursor.

20. A well plate comprising:
a substrate having opposing first and second surfaces;
a primary structure attached to the first surface of the substrate, the primary structure comprising a plurality of walls attached to and extending away from the first surface wherein the plurality of walls and the first surface of the substrate together define a plurality of wells; and
a light absorbent secondary structure attached to the first surface of the substrate, the secondary structure comprising, within each one of the plurality of the wells, a plurality of sub-walls attached to and extending away from the first surface wherein each plurality of sub-walls and the first surface of the substrate together define a plurality of sub-wells;
wherein the secondary structure comprises a polymerized solid having a mixture of precursor components, the precursor components comprising a structural precursor, a viscosity modifying precursor, a photo-initiator precursor and a pigment precursor;
wherein the mixture of precursor components comprises a surface modifying precursor.

21. The well plate according to claim 1 wherein the secondary structure is black.

* * * * *